(12) United States Patent
Yu et al.

(10) Patent No.: US 12,395,124 B2
(45) Date of Patent: Aug. 19, 2025

(54) PHOTOVOLTAIC CELL DETECTION METHOD, APPARATUS, AND SYSTEM, MEDIUM, AND CHIP

(71) Applicant: Huawei Digital Power Technologies Co., Ltd., Shenzhen (CN)

(72) Inventors: Xinyu Yu, Shanghai (CN); Jianqiang Wang, Shanghai (CN); Song Wan, Shanghai (CN); Kai Xin, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 187 days.

(21) Appl. No.: 18/454,211

(22) Filed: Aug. 23, 2023

(65) Prior Publication Data

US 2023/0421098 A1    Dec. 28, 2023

Related U.S. Application Data

(63) Continuation of application No. PCT/CN2021/077511, filed on Feb. 23, 2021.

(51) Int. Cl.
*H02S 50/15* (2014.01)
*H02J 3/38* (2006.01)

(52) U.S. Cl.
CPC .............. *H02S 50/15* (2014.12); *H02J 3/381* (2013.01); *H02J 2300/26* (2020.01)

(58) Field of Classification Search
CPC .......... H02S 50/15; H02S 50/10; H02J 3/381; H02J 2300/26; G06T 2207/10048; G06T 2207/30148; G06T 7/0004
See application file for complete search history.

(56) References Cited

U.S. PATENT DOCUMENTS

| | | | |
|---|---|---|---|
| 9,680,412 B2 | 6/2017 | Stoicescu et al. | |
| 2020/0134318 A1* | 4/2020 | Li | H02S 50/15 |
| 2021/0050816 A1* | 2/2021 | Ma | H02S 40/32 |
| 2021/0135625 A1* | 5/2021 | Deng | G06V 10/774 |
| 2021/0408968 A1* | 12/2021 | Wang | H02H 7/20 |

FOREIGN PATENT DOCUMENTS

| | | |
|---|---|---|
| CN | 104685349 A | 6/2015 |
| CN | 107257230 A | 10/2017 |
| CN | 107659266 A | 2/2018 |
| WO | 2021027366 A1 | 2/2021 |

* cited by examiner

*Primary Examiner* — Lee E Rodak
*Assistant Examiner* — Zannatul Ferdous
(74) *Attorney, Agent, or Firm* — Conley Rose, P.C.

(57) ABSTRACT

A photovoltaic cell detection method includes determining a first output power working at a first voltage and a second output power working at a second voltage, where a difference between the first output power and the second output power is less than a power difference threshold, and where both the first output power and the second output power are greater than 0; controlling the photovoltaic cell to work at the first voltage, and obtaining first infrared image information of the photovoltaic cell; and controlling the photovoltaic cell to work at the second voltage, and obtaining second infrared image information of the photovoltaic cell, where both the first infrared image information and the second infrared image information are used to jointly detect whether the photovoltaic cell is faulty.

16 Claims, 13 Drawing Sheets

PHOTOVOLTAIC CELL DETECTION METHOD, APPARATUS, AND SYSTEM, MEDIUM, AND CHIP

CROSS-REFERENCE TO RELATED APPLICATIONS

This is a continuation of International Patent Application No. PCT/CN2021/077511 filed on Feb. 23, 2021, the disclosure of which is hereby incorporated by reference in its entirety.

TECHNICAL FIELD

This disclosure relates to the field of electric power technologies, and in particular, to a photovoltaic cell detection method, apparatus, and system, a medium, and a chip.

BACKGROUND

Light is a type of renewable clean energy. A photovoltaic power generation technology has been widely studied, and the photovoltaic power generation industry has developed rapidly in recent years. A photovoltaic power generation system may usually include a plurality of components such as a photovoltaic module, an inverter, a transformer, and a cable. The photovoltaic module can convert energy of sunlight into electric energy. A status of health of the photovoltaic module greatly affects a yield of electric energy that can be generated by the photovoltaic power generation system. If the photovoltaic module is faulty, electric energy output by the photovoltaic power generation system is significantly affected, causing loss to an electric energy yield and benefits of a photovoltaic power station.

In the daytime, a status of health of a photovoltaic cell can be detected by using a photo luminescence (PL) detection method. When the photovoltaic cell receives light of a specific wavelength, an electron in a ground state in the photovoltaic cell absorbs a photon and enters an excited state, and emits infrared light when returning to the ground state in a short period of time. In the PL detection method, based on this characteristic of the photovoltaic cell, a high-sensitivity and high-resolution camera may be used to perform light sensing on the infrared light emitted by the photovoltaic cell, and collect an image (a PL image) of the photovoltaic cell. Through analysis of the PL image, whether the photovoltaic cell is faulty can be determined.

In a PL detection solution, a signal source needs to be added to a photovoltaic power station. The signal source may output at least one modulation frequency, and modulate an output power of a photovoltaic cell, so that the photovoltaic cell works at two working points: a short-circuit working point and an open-circuit working point, and then collects images of the photovoltaic cell at the two working points. The short-circuit working point is a voltage of the photovoltaic cell corresponding to a case in which the photovoltaic cell is short-circuited, and the open-circuit working point is a voltage of the photovoltaic cell in an unloaded state. A power/voltage characteristic curve of the photovoltaic cell is shown in FIG. 1. The short-circuit working point is K1, and the open-circuit working point is K2. In addition, differential processing is performed on images corresponding to the two working points, to filter out background noise generated when sunlight is irradiated on the photovoltaic cell. A status of health of the photovoltaic cell may be determined through analysis of an image obtained through the differential processing.

If the photovoltaic cell is detected by using this solution, because the photovoltaic cell is switched between the two working points: the short-circuit working point and the open-circuit working point, the detected photovoltaic cell fluctuates drastically in a short period of time. Therefore, an overall power of the photovoltaic power station fluctuates drastically in a short period of time, and consequently, a voltage at a grid connection point of the photovoltaic power station flickers, and grid connection quality is affected.

SUMMARY

This disclosure provides a photovoltaic cell detection method, apparatus, and system, a medium, and a chip, to detect a photovoltaic cell in a running photovoltaic system, avoid large power fluctuation of an output power of the detected photovoltaic cell, and also avoid large fluctuation of an output power of the photovoltaic system.

According to a first aspect, an embodiment of this disclosure provides a photovoltaic cell detection method, and the photovoltaic cell detection method is applied to a photovoltaic system and may be performed by a control device or a control apparatus. The method includes: determining a working voltage corresponding to a to-be-detected photovoltaic cell, where the working voltage includes a first voltage and a second voltage, an output power of the to-be-detected photovoltaic cell working at the first voltage is a first output power, an output power of the to-be-detected photovoltaic cell working at the second voltage is a second output power, a difference between the first output power and the second output power is less than a preset power difference threshold, and both the first output power and the second output power are greater than 0; controlling the to-be-detected photovoltaic cell to work at the first voltage, and obtaining first infrared image information of the to-be-detected photovoltaic cell; and controlling the to-be-detected photovoltaic cell to work at the second voltage, and obtaining second infrared image information of the to-be-detected photovoltaic cell, where the first infrared image information and the second infrared image information are used to jointly detect whether the to-be-detected photovoltaic cell is faulty.

In the foregoing technical solution, when the control device controls the to-be-detected photovoltaic cell to work at the first voltage, an output power of the to-be-detected photovoltaic cell may be the first output power, and when the control device controls the to-be-detected photovoltaic cell to work at the second voltage, the output power of the to-be-detected photovoltaic cell may be the second output power. When detecting the to-be-detected photovoltaic cell, the control device collects infrared image information of the to-be-detected photovoltaic cell. The control device may detect a photovoltaic cell in the photovoltaic system in a running process of the system. In addition, in a process of detecting the to-be-detected photovoltaic cell, the to-be-detected photovoltaic cell does not stop working. The control device may obtain the first infrared image information when the to-be-detected photovoltaic cell outputs the first output power, and obtain the second infrared image information when the to-be-detected photovoltaic cell outputs the second output power. Because the difference between the first output power and the second output power is less than the preset power difference threshold, and both the first output power and the second output power are greater than 0, in a process in which the control device obtains the infrared image information of the to-be-detected photovoltaic cell, an output power of a detected photovoltaic cell changes slightly, to avoid large fluctuation of the output power of the detected photovoltaic cell, so that fluctuation of a total output power of the photovoltaic system obtained when the photovoltaic cell is detected is avoided.

In a possible implementation, both the first output power and the second output power are less than a preset output power threshold.

In a possible implementation, the preset output power threshold is a maximum power point of the photovoltaic cell.

In a possible implementation, the first voltage is less than or equal to a voltage corresponding to the photovoltaic cell at the maximum power point, and the second voltage is greater than the voltage corresponding to the photovoltaic cell at the maximum power point.

In a possible implementation, the first output power is equal to the second output power, and the first voltage is not equal to the second voltage.

In the foregoing technical solution, the difference between the first output power and the second output power is 0, and in a process in which the control device detects the to-be-detected photovoltaic cell, the output power of the to-be-detected photovoltaic cell remains unchanged, to avoid large power fluctuation in the photovoltaic system.

In a possible implementation, before the determining a working voltage corresponding to a to-be-detected photovoltaic cell, the method further includes: determining a third output power corresponding to the to-be-detected photovoltaic cell; and the determining a working voltage corresponding to a to-be-detected photovoltaic cell includes: determining, based on a correspondence between output powers of the to-be-detected photovoltaic cell at different voltages, a voltage corresponding to the third output power as the working voltage corresponding to the to-be-detected photovoltaic cell.

In the foregoing technical solution, the control device may determine the output power corresponding to the to-be-detected photovoltaic cell, and the control device may control the working voltage of the to-be-detected photovoltaic cell to control the to-be-detected photovoltaic cell to output the corresponding output power.

In a possible implementation, the determining a third output power corresponding to the to-be-detected photovoltaic cell includes: determining the third output power based on a preset proportion parameter and a current output power of the to-be-detected photovoltaic cell; selecting a power from a preset power range as the third output power, where the preset power range is determined based on a first adjustment parameter and a power reference value corresponding to the to-be-detected photovoltaic cell, and the power reference value corresponding to the to-be-detected photovoltaic cell is determined based on the preset proportion parameter and the current output power of the to-be-detected photovoltaic cell; if the photovoltaic system includes a plurality of photovoltaic cells, determining, as the third output power, an output power of a previous detected photovoltaic corresponding to a case in which infrared image information that is of the previous detected photovoltaic cell and that meets a preset image detection condition is obtained; or if latest obtained infrared image information of the to-be-detected photovoltaic cell does not meet a preset image detection condition, determining a fourth output power as the third output power, where the fourth output power is less than an output power of the to-be-detected photovoltaic corresponding to a case in which the latest obtained infrared image information of the to-be-detected photovoltaic cell is obtained.

In the foregoing technical solution, a manner in which the control device determines the third output power corresponding to the to-be-detected photovoltaic cell is flexible. For example, the third output power corresponding to the to-be-detected photovoltaic cell may be determined based on the preset proportion parameter and the current output power of the to-be-detected photovoltaic cell, or the control device may select a power value from the preset power range as the third output power corresponding to the to-be-detected photovoltaic cell, and this can avoid output power fluctuation of the to-be-detected photovoltaic cell before and when the to-be-detected photovoltaic cell is detected. The control device may alternatively use the output power corresponding to the previous detected photovoltaic cell as the output power corresponding to the to-be-detected photovoltaic cell, to avoid fluctuation of a total power of the photovoltaic system when detection of the previous photovoltaic cell is switched to detection of the to-be-detected photovoltaic cell. The control device may adjust, based on a status of the infrared image information of the to-be-detected photovoltaic cell, the third output power corresponding to the to-be-detected photovoltaic cell, so that the output power corresponding to the to-be-detected photovoltaic cell can be dynamically adjusted, and a limitation exerted by a factor such as illumination on detection of whether the photovoltaic cell is faulty can be reduced.

In a possible implementation, the method further includes: if the first infrared image information and the second infrared image information do not meet the preset image detection condition, re-determining the working voltage corresponding to the to-be-detected photovoltaic cell.

In the foregoing technical solution, the control device may adjust, based on a status of the infrared image information of the to-be-detected photovoltaic cell, the third output power corresponding to the to-be-detected photovoltaic cell, so that the output power corresponding to the to-be-detected photovoltaic cell can be dynamically adjusted, and a limitation exerted by a factor such as illumination on detection of whether the photovoltaic cell is faulty can be reduced.

In a possible implementation, the system further includes a direct current/direct current (DC/DC) conversion module, and the to-be-detected photovoltaic cell is connected to the DC/DC conversion module. The controlling the to-be-detected photovoltaic cell to work at the first voltage includes: sending, to the DC/DC conversion module, a first control command that carries first indication information, where the first indication information indicates the DC/DC conversion module to enable the to-be-detected photovoltaic cell to output the first voltage. The controlling the to-be-detected photovoltaic cell to work at the second voltage includes: sending, to the DC/DC conversion module, a second control command that carries second indication information, where the second indication information indicates the DC/DC conversion module to enable the to-be-detected photovoltaic cell to output the second voltage.

In the foregoing technical solution, the control device may send a control command to the DC/DC conversion module, so that the DC/DC conversion module provides a working voltage for the to-be-detected photovoltaic cell, and in this way, when working at the voltage, the to-be-detected photovoltaic cell can output an output power corresponding to the voltage.

In a possible implementation, the photovoltaic system includes a plurality of photovoltaic cells, and the to-be-detected photovoltaic cell is any one of the plurality of photovoltaic cells. Before the controlling the to-be-detected photovoltaic cell to output the first voltage, the method further includes: determining, based on the first output power and a current output power of the to-be-detected photovoltaic cell, a power adjustment amount corresponding to at least one first photovoltaic cell, or determining, based on the second output power and a current output power of the to-be-detected photovoltaic cell, a power adjustment amount corresponding to at least one first photovoltaic cell, where the first photovoltaic cell is any photovoltaic cell other than the to-be-detected photovoltaic cell in the plurality of photovoltaic cells; and adjusting an output power of the at least one first photovoltaic cell based on the power adjustment amount corresponding to the at least one first photovoltaic cell.

In a possible implementation, the plurality of photovoltaic cells are connected to a DC/DC conversion module; and the adjusting an output power of the at least one first photovoltaic cell includes: sending, to the DC/DC conversion module, a third control command that carries third indication information, where the third indication information indicates the DC/DC conversion module to change the output power of the at least one first photovoltaic cell based on the power adjustment amount.

In a possible implementation, the photovoltaic system includes a plurality of photovoltaic cells, and the to-be-detected photovoltaic cell is any one of the plurality of photovoltaic cells. Before the controlling the to-be-detected photovoltaic cell to work at the first voltage, the method further includes: determining a total target output power of the photovoltaic system based on the preset output power threshold and a current output power of each photovoltaic cell other than the to-be-detected photovoltaic cell in the plurality of photovoltaic cells; determining a total power adjustment amount of second photovoltaic cells other than the to-be-detected photovoltaic cell in the plurality of photovoltaic cells based on a preset power adjustment parameter and the total target output power; determining, based on the total power adjustment amount, a power adjustment amount corresponding to at least one second photovoltaic cell; and adjusting an output power of the at least one second photovoltaic cell based on the power adjustment amount corresponding to the at least one second photovoltaic cell.

In the foregoing technical solution, in a process of detecting the to-be-detected photovoltaic cell, the control device adjusts an output power of another photovoltaic cell to stabilize a total output power of the photovoltaic system or maintain a total output power of the photovoltaic system, so that normal running of the photovoltaic system can be ensured.

In a possible implementation, the plurality of photovoltaic cells are connected to a DC/DC conversion module; and the adjusting an output power of the at least one second photovoltaic cell includes: sending, to the DC/DC conversion module, a fourth control command that carries fourth indication information, where the fourth indication information indicates the DC/DC conversion module to change the output power of the at least one second photovoltaic cell based on the power adjustment amount.

According to a second aspect, an embodiment of this disclosure further provides a photovoltaic cell detection apparatus, including a processor and a memory. The memory stores a program, instructions, or code, and when the program, the instructions, or the code is invoked by the processor, the following operations are performed: determining a working voltage corresponding to a to-be-detected photovoltaic cell, where the working voltage includes a first voltage and a second voltage, an output power of the to-be-detected photovoltaic cell working at the first voltage is a first output power, an output power of the to-be-detected photovoltaic cell working at the second voltage is a second output power, a difference between the first output power and the second output power is less than a preset power difference threshold, and both the first output power and the second output power are greater than 0; controlling the to-be-detected photovoltaic cell to work at the first voltage, and obtaining first infrared image information of the to-be-detected photovoltaic cell; and controlling the to-be-detected photovoltaic cell to work at the second voltage, and obtaining second infrared image information of the to-be-detected photovoltaic cell, where the first infrared image information and the second infrared image information are used to jointly detect whether the to-be-detected photovoltaic cell is faulty.

In a possible implementation, both the first output power and the second output power are less than a preset output power threshold.

In a possible implementation, the preset output power threshold is a maximum power point of the photovoltaic cell.

In a possible implementation, the first voltage is less than or equal to a voltage corresponding to the photovoltaic cell at the maximum power point, and the second voltage is greater than the voltage corresponding to the photovoltaic cell at the maximum power point.

In a possible implementation, the first output power is equal to the second output power, and the first voltage is not equal to the second voltage.

In a possible implementation, the processor is further configured to: before determining the working voltage corresponding to the to-be-detected photovoltaic cell, determine a third output power corresponding to the to-be-detected photovoltaic cell; and when determining the working voltage corresponding to the to-be-detected photovoltaic cell, the processor is configured to determine, based on a correspondence between output powers of the to-be-detected photovoltaic cell at different voltages, a voltage corresponding to the third output power as the working voltage corresponding to the to-be-detected photovoltaic cell.

In a possible implementation, when determining the third output power corresponding to the to-be-detected photovoltaic cell, the processor is configured to: determine the third output power based on a preset proportion parameter and a current output power of the to-be-detected photovoltaic cell; select a power from a preset power range as the third output power, where the preset power range is determined based on a first adjustment parameter and a power reference value corresponding to the to-be-detected photovoltaic cell, and the power reference value corresponding to the to-be-detected photovoltaic cell is determined based on the preset proportion parameter and the current output power of the to-be-detected photovoltaic cell; if a photovoltaic system includes a plurality of photovoltaic cells, determine, as the third output power, an output power of a previous detected photovoltaic corresponding to a case in which infrared image information that is of the previous detected photovoltaic cell and that meets a preset image detection condition is obtained; or if latest obtained infrared image information of the to-be-detected photovoltaic cell does not meet a preset image detection condition, determine a fourth output power as the third output power, where the fourth output power is less than an output power of the to-be-detected photovoltaic corresponding to a case in which the latest obtained infrared image information of the to-be-detected photovoltaic cell is obtained.

In a possible implementation, the processor is further configured to: if the first infrared image information and the second infrared image information do not meet the preset image detection condition, re-determine the working voltage corresponding to the to-be-detected photovoltaic cell.

In a possible implementation, the system further includes a DC/DC conversion module, and the to-be-detected photovoltaic cell is connected to the DC/DC conversion module. When controlling the to-be-detected photovoltaic cell to work at the first voltage, the processor is configured to send, to the DC/DC conversion module, a first control command that carries first indication information, where the first indication information indicates the DC/DC conversion module to enable the to-be-detected photovoltaic cell to output the first voltage. The controlling the to-be-detected photovoltaic cell to work at the second voltage includes: sending, to the DC/DC conversion module, a second control command that carries second indication information, where the second indication information indicates the DC/DC conversion module to enable the to-be-detected photovoltaic cell to output the second voltage.

In a possible implementation, the photovoltaic system includes a plurality of photovoltaic cells, and the to-be-detected photovoltaic cell is any one of the plurality of photovoltaic cells. The processor is further configured to: before controlling the to-be-detected photovoltaic cell to output the first voltage, determine, based on the first output power and a current output power of the to-be-detected photovoltaic cell, a power adjustment amount corresponding to at least one first photovoltaic cell, or determine, based on the second output power and a current output power of the to-be-detected photovoltaic cell, a power adjustment amount corresponding to at least one first photovoltaic cell, where the first photovoltaic cell is any photovoltaic cell other than the to-be-detected photovoltaic cell in the plurality of photovoltaic cells; and adjust an output power of the at least one first photovoltaic cell based on the power adjustment amount corresponding to the at least one first photovoltaic cell.

In a possible implementation, the plurality of photovoltaic cells is connected to a DC/DC conversion module. When adjusting the output power of the at least one first photovoltaic cell, the processor is configured to send, to the DC/DC conversion module, a third control command that carries third indication information, where the third indication information indicates the DC/DC conversion module to change the output power of the at least one first photovoltaic cell based on the power adjustment amount.

In a possible implementation, the photovoltaic system includes a plurality of photovoltaic cells, and the to-be-detected photovoltaic cell is any one of the plurality of photovoltaic cells. The processor is further configured to: before controlling the to-be-detected photovoltaic cell to work at the first voltage, determine a total target output power of the photovoltaic system based on the preset output power threshold and a current output power of each photovoltaic cell other than the to-be-detected photovoltaic cell in the plurality of photovoltaic cells; determine a total power adjustment amount of second photovoltaic cells other than the to-be-detected photovoltaic cell in the plurality of photovoltaic cells based on a preset power adjustment parameter and the total target output power; determine, based on the total power adjustment amount, a power adjustment amount corresponding to at least one second photovoltaic cell; and adjust an output power of the at least one second photovoltaic cell based on the power adjustment amount corresponding to the at least one second photovoltaic cell.

In a possible implementation, the plurality of photovoltaic cells is connected to a DC/DC conversion module. When adjusting the output power of the at least one second photovoltaic cell, the processor is configured to send, to the DC/DC conversion module, a fourth control command that carries fourth indication information, where the fourth indication information indicates the DC/DC conversion module to change the output power of the at least one second photovoltaic cell based on the power adjustment amount.

According to a third aspect, an embodiment of this disclosure provides a photovoltaic cell detection system, including a DC/DC conversion module, a collection device, and a control device. The control device is connected to the DC/DC conversion module and the collection device, the DC/DC conversion module is configured to connect to a plurality of photovoltaic cells, and the control device includes any photovoltaic cell detection apparatus in the second aspect and any possible design of the second aspect. The collection device is configured to collect infrared image information of a to-be-detected photovoltaic cell in the plurality of photovoltaic cells, where the to-be-detected photovoltaic cell is any one of the plurality of photovoltaic cells. The control device is configured to control a voltage of the to-be-detected photovoltaic cell by using the DC/DC conversion module.

According to a fourth aspect, an embodiment of this disclosure provides a photovoltaic system, including a plurality of photovoltaic cells and the photovoltaic cell detection system according to the third aspect, and the photovoltaic cell detection system is configured to detect whether there is a faulty photovoltaic cell in the plurality of photovoltaic cells.

According to a fifth aspect, an embodiment of this disclosure provides a computer-readable storage medium. The computer-readable storage medium includes a computer program. When the computer program is run on a processor, the processor is enabled to perform the technical solution in the first aspect of embodiments of this disclosure and any possible design of the first aspect.

According to a sixth aspect, an embodiment of this disclosure provides a chip. The chip is coupled to a memory, and is configured to invoke and execute computer program instructions stored in the memory, so that the technical solution in the first aspect and any possible design of the first aspect is performed.

According to a seventh aspect, an embodiment of this disclosure provides a chip. The chip includes a memory and a processor. The memory stores computer program instructions, and the processor loads and invokes the computer program instructions, so that the technical solution in the first aspect of embodiments of this disclosure and any possible design of the first aspect can be performed.

According to an eighth aspect, an embodiment of this disclosure provides a computer program product. When the computer program product is run on an electronic device, the electronic device is enabled to perform the technical solution in the first aspect of embodiments of this disclosure and any possible design of the first aspect.

In addition, for technical effects brought by any possible design in the second to the eighth aspects, refer to technical effects brought by different designs in the method part. Details are not described herein again.

DESCRIPTIONS OF DRAWINGS

DESCRIPTION OF EMBODIMENTS

Light is a type of renewable clean energy. A photovoltaic power generation technology has been widely studied, and the photovoltaic power generation industry has developed rapidly in recent years. A photovoltaic power generation system may usually include a plurality of components such as a photovoltaic module, an inverter, a transformer, and a cable. The photovoltaic module can convert energy of sunlight into electric energy. A status of health of the photovoltaic module greatly affects a yield of electric energy that can be generated by the photovoltaic power generation system. If the photovoltaic module is faulty, electric energy output by the photovoltaic power generation system is significantly affected, causing loss to an electric energy yield and benefits of a photovoltaic power station.

Figure 1:
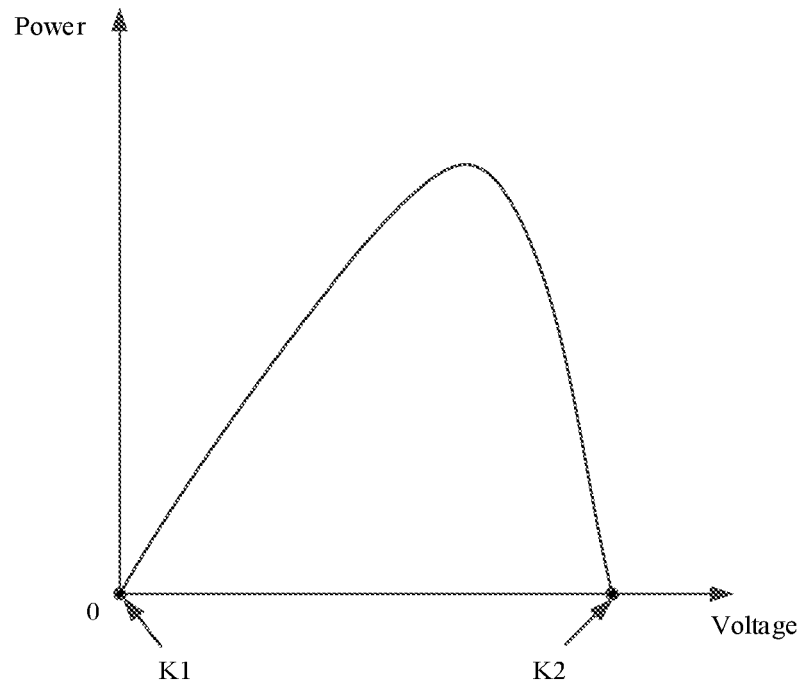
FIG. 1 is a schematic diagram of a relationship between a power and a voltage of a photovoltaic cell.
Figure 2:
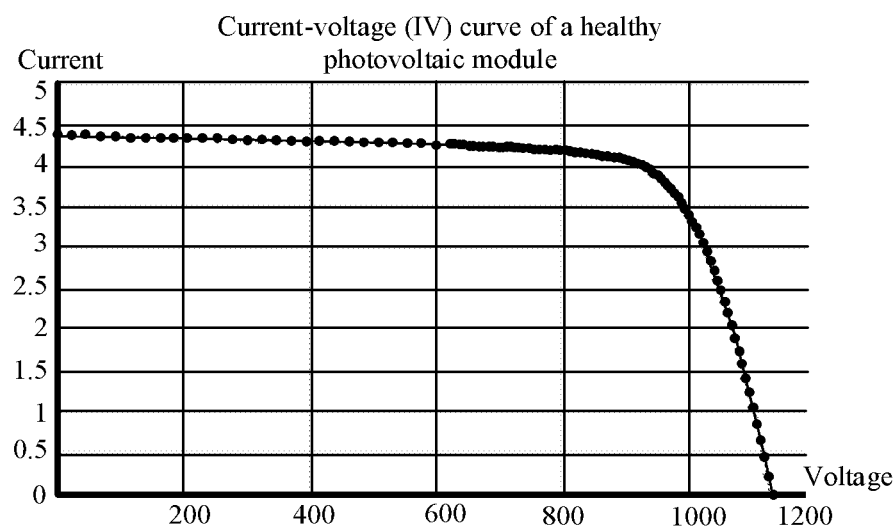
FIG. 2 is a schematic diagram of a relationship between a current and a voltage of a healthy photovoltaic module.

Currently, methods for detecting the status of health of the photovoltaic module include a current-voltage (IV) curve scanning method and a photovoltaic module image detection method. In the IV curve scanning method (which may also be referred to as an IV curve scanning technology for the photovoltaic module), when temperature and illumination intensity are fixed, an IV curve of the photovoltaic module needs to be drawn by using a change of an output current of the photovoltaic module with a voltage applied between two ends of the photovoltaic module. Generally, scanning is performed from an open-circuit voltage to a short-circuit voltage under control to obtain the voltage between the two ends of the photovoltaic module, and output currents of the photovoltaic module at different voltages are collected, to draw a curve relationship between an output current and a voltage of the photovoltaic module. An IV curve of a healthy photovoltaic module is parabolic, as shown in FIG. 2. If a photovoltaic module is damaged or blocked, an IV curve of the photovoltaic module is distorted. A status of health of the photovoltaic module may be determined by determining whether the IV curve is distorted, and this provides a basis for maintaining the photovoltaic module.

Image detection methods for the photovoltaic module may include an electro luminescence (EL) detection method and a PL detection method. In the EL detection method, when a bias voltage is applied to a photovoltaic cell (which may include one or more photovoltaic modules) to inject a backflow current, the photovoltaic cell may be equivalently considered as a light-emitting diode with low light emitting efficiency. After the bias voltage is applied to the photovoltaic cell to inject the backflow current, a captured image of the photovoltaic cell is an image with specific brightness that is formed due to light emitting of the photovoltaic cell, and may be denoted as an EL image. The EL image is analyzed to determine whether the photovoltaic cell is faulty, for example, whether the photovoltaic cell has a problem such as a micro crack, a broken grid, sintering, impurity, or a defect.

In the PL detection method, when a photovoltaic cell receives light of a specific wavelength, an electron in a ground state in the photovoltaic cell absorbs a photon and enters an excited state, and emits infrared light when returning to the ground state in a short period of time. Based on this characteristic of the photovoltaic cell, a high-sensitivity and high-resolution camera may be used to perform light sensing on the infrared light emitted by the photovoltaic cell, and a captured image of the photovoltaic cell may be denoted as a PL image. Through analysis of the PL image, whether the photovoltaic cell is faulty can be determined.

In comparison with the IV curve scanning method, in the module image detection method, a fault type and a fault location of the photovoltaic module can be intuitively determined by using an image of the module. Currently, when a photovoltaic module is delivered from a factory or installed, the photovoltaic module is detected by using the EL detection method and the PL detection method. In an actual application scenario, after the photovoltaic module is installed in a power station, a new fault may also occur in the photovoltaic module. Therefore, after the photovoltaic module is installed in the power station, it is also very necessary to determine a status of health of the photovoltaic module.

After the photovoltaic module is installed in the power station, the status of health of a photovoltaic cell may be determined at night by using the EL detection method. In a method for determining the status of health of the photovoltaic cell at night by using the EL detection method, an additional circuit needs to be added to the power station, and a backflow control circuit needs to be added to a controller. This increases hardware costs of a photovoltaic system. In addition, operation and maintenance personnel need to perform operation and maintenance on the photovoltaic cell at night.

Figure 3:
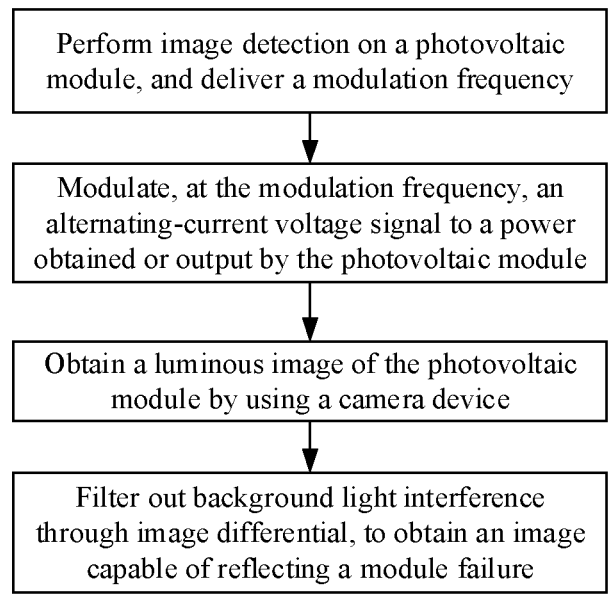
FIG. 3 is a schematic flowchart of a photovoltaic cell detection method.

To prevent operation and maintenance personnel from handling operation and maintenance work of the photovoltaic cell at night, the status of health of the photovoltaic cell may be determined in the daytime, for example, by using the EL/PL detection method. In the method (as shown in FIG. 3), a signal source is added to the photovoltaic system. The signal source may output at least one modulation frequency, to modulate a power obtained or output by the photovoltaic cell, so that the photovoltaic cell works at two different working points (a short-circuit working point and an open-circuit working point). In addition, images, such as EL images or PL images, of the photovoltaic cell at the two working points are separately captured. Then, differential processing is performed on the EL images or the PL images corresponding to the photovoltaic cell at the two working points, to filter out background noise generated when sunlight is irradiated on the photovoltaic cell. Through analysis of an image obtained through the differential processing, the status of health of the photovoltaic cell can be determined.

However, in a process of obtaining the PL image, because an obtained power of the photovoltaic cell is in a modulation mode, an output power of the detected photovoltaic cell jumps at the two working points in a detection process. In a process of obtaining the PL image, an input power of the photovoltaic cell is also in the modulation mode, and an obtained power also jumps at the two working points. In this method, the status of health of the photovoltaic cell may be detected in the daytime, and this is friendly to operation and maintenance personnel. However, in a process of detecting the photovoltaic cell, when the photovoltaic cell works at two different working points, the detected photovoltaic cell fluctuates drastically in a short period of time, and an overall power of the photovoltaic system also fluctuates drastically in a short period of time. Consequently, a voltage at a grid connection point of the photovoltaic system is prone to flicker, and grid connection quality is affected.

To resolve the foregoing problem, embodiments of this disclosure provide a photovoltaic cell detection method, system, and apparatus, a medium, and a photovoltaic system, so that not only a photovoltaic cell in the photovoltaic system can be detected, but fluctuation of an overall power of the photovoltaic system can also be avoided, and the foregoing problem can also be avoided. Embodiments of this disclosure are described below with reference to the accompanying drawings.

Figure 4:
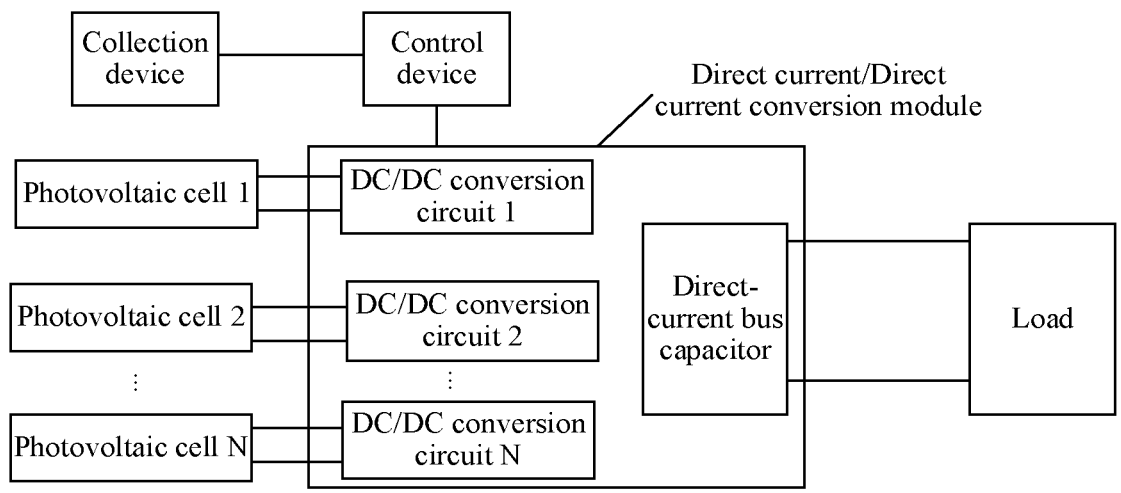
FIG. 4 is a schematic diagram of a structure of a photovoltaic system.

The photovoltaic cell detection method provided in this disclosure may be applied to a photovoltaic system. As shown in FIG. 4, the photovoltaic system may include a plurality of photovoltaic cells and a DC/DC conversion module. The DC/DC conversion module includes a plurality of DC/DC conversion circuits and a DC bus capacitor. The photovoltaic system can supply power to a load, that is, provides a power for the load.

The plurality of photovoltaic cells may be in a one-to-one correspondence with the DC/DC conversion circuits in the DC/DC conversion module, and one photovoltaic cell is connected to one DC/DC conversion circuit. The photovoltaic cell may convert optical energy into electric energy. The photovoltaic cell can convert optical energy into a DC under the action of a voltage provided by the DC/DC conversion circuit, to generate an output power. For example, a relationship between the voltage provided by the DC/DC conversion circuit for the photovoltaic cell and the output power of the photovoltaic cell may be a relationship between a voltage and a power shown in FIG. 5.

Figure 5:
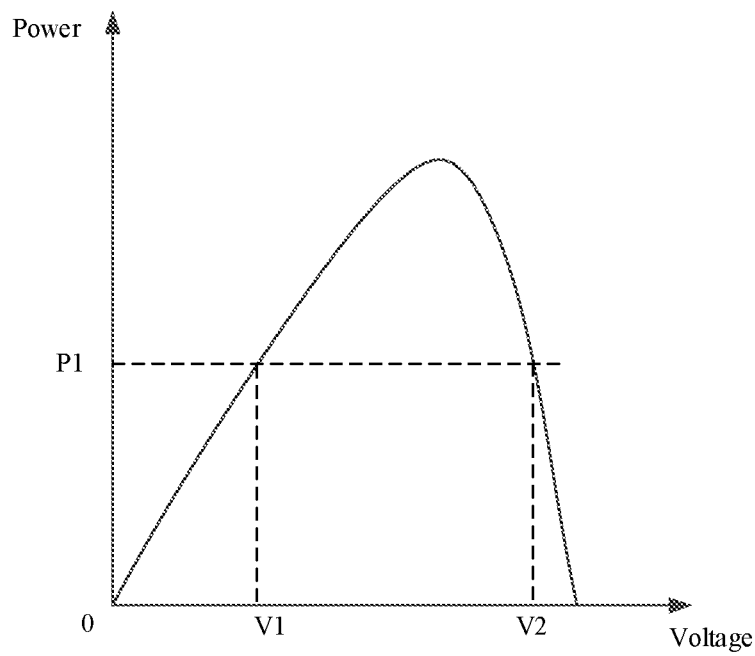
FIG. 5 is a schematic diagram of a relationship between a power and a voltage of a photovoltaic cell.

As shown in FIG. 5, when the DC/DC conversion circuit provides a voltage V1 (which may also be denoted as that a working point of the photovoltaic cell is V1) for the photovoltaic cell, an output power of the photovoltaic cell is P1, and when the DC/DC conversion circuit provides a voltage V2 for the photovoltaic cell, an output power of the photovoltaic cell is also P1. It can be learned that output powers of the photovoltaic cell may be the same when the DC/DC conversion circuit provides two different voltages. In other words, when the photovoltaic cell works at different working points, output powers of the photovoltaic cell may be the same.

In this embodiment of this disclosure, in the relationship between the voltage provided by the DC/DC conversion circuit for the photovoltaic cell and the output power of the photovoltaic cell, a maximum output power Pmax of the photovoltaic cell may uniquely correspond to a voltage Vm, or a maximum power point Pmax uniquely corresponds to a voltage Vm. The maximum output power Pmax of the photovoltaic cell may alternatively correspond to a plurality of voltages, or the maximum power point Pmax may correspond to a plurality of voltages VN. When the photovoltaic cell works at any working point in the plurality of voltages VN, an output power of the photovoltaic cell is always the maximum output power Pmax.

Figure 6:
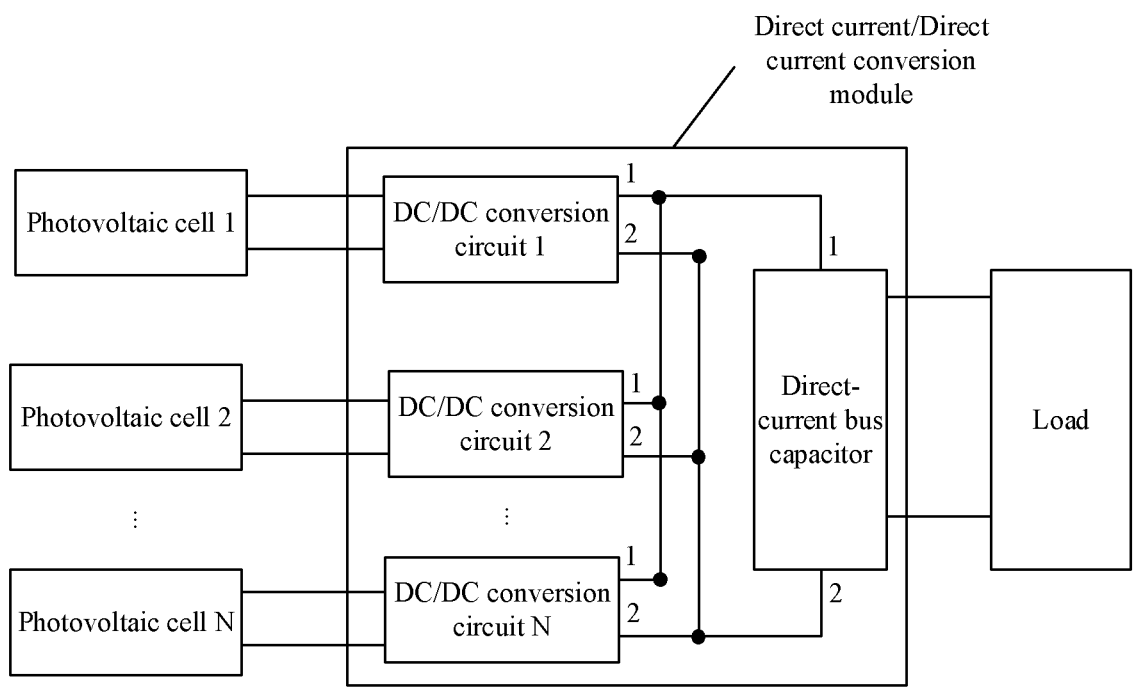
FIG. 6 is a schematic diagram of a structure of another photovoltaic system.

In a possible implementation, the plurality of DC/DC conversion circuits in the DC/DC conversion module are connected in parallel. As shown in FIG. 6, a first output end of each DC/DC conversion circuit is connected to a first end of the DC bus capacitor, and a second output end of each DC/DC conversion circuit is connected to a second end of the DC bus capacitor. A first input end of each DC/DC conversion circuit is connected to a first end of the photovoltaic cell, and a second input end of each DC/DC conversion circuit is connected to a second end of the photovoltaic cell.

Each DC/DC conversion circuit may be connected to one photovoltaic cell. The photovoltaic cell may include one photovoltaic string, or include a plurality of photovoltaic strings connected in series. Each DC/DC conversion circuit may adjust a voltage of a photovoltaic cell connected to the DC/DC conversion circuit, that is, adjust a working point of each photovoltaic cell. Each DC/DC conversion circuit may also adjust an output power of the photovoltaic cell connected to the DC/DC conversion circuit.

Figure 7:
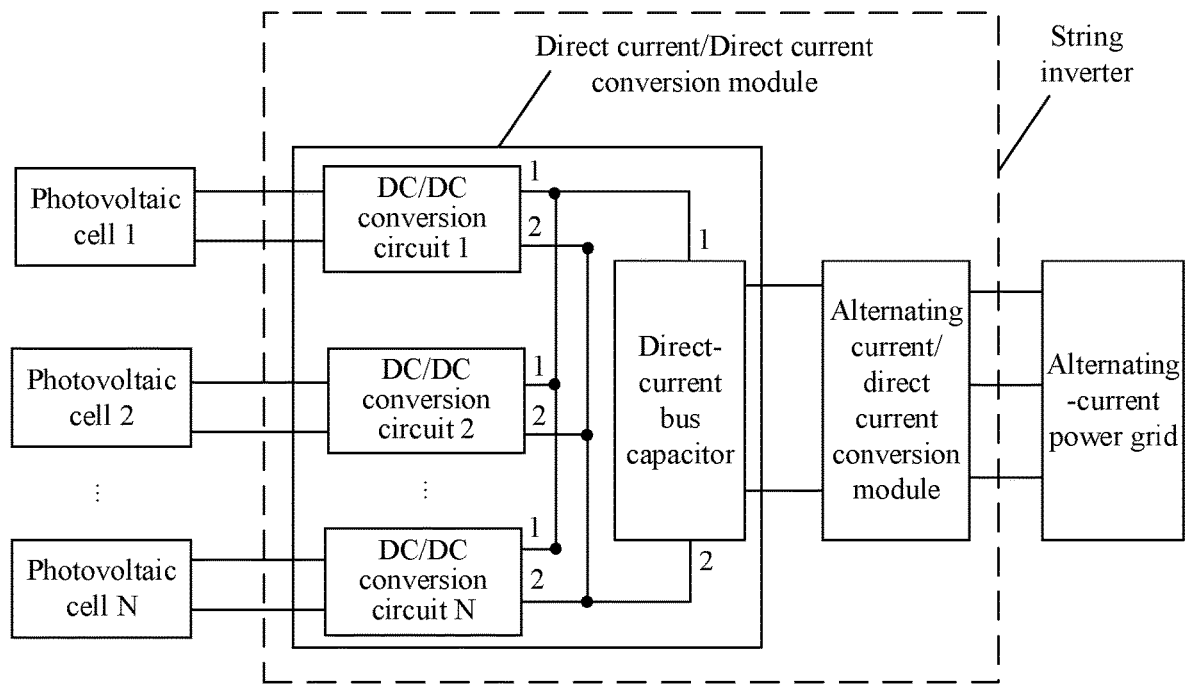
FIG. 7 is a schematic diagram of a structure of still another photovoltaic system.

In a possible design, the photovoltaic system further includes a DC/alternating current (AC) conversion circuit. Two input ends of the DC/AC conversion circuit are separately connected to the first end and the second end of the DC bus capacitor. As shown in FIG. 7, the DC/AC conversion circuit may convert a DC into an AC. An output end of the DC/AC conversion circuit may be connected to an AC power grid, and the AC power grid may be a three-phase AC power grid.

The plurality of DC/DC conversion circuits, the DC bus capacitor, and the DC/AC conversion circuit in the photovoltaic system may form a string inverter. The photovoltaic system provided in this embodiment of this disclosure may be a photovoltaic system that is based on the string inverter, and may be applied to an application scenario such as a large photovoltaic power station that is based on the string inverter.

Figure 8:
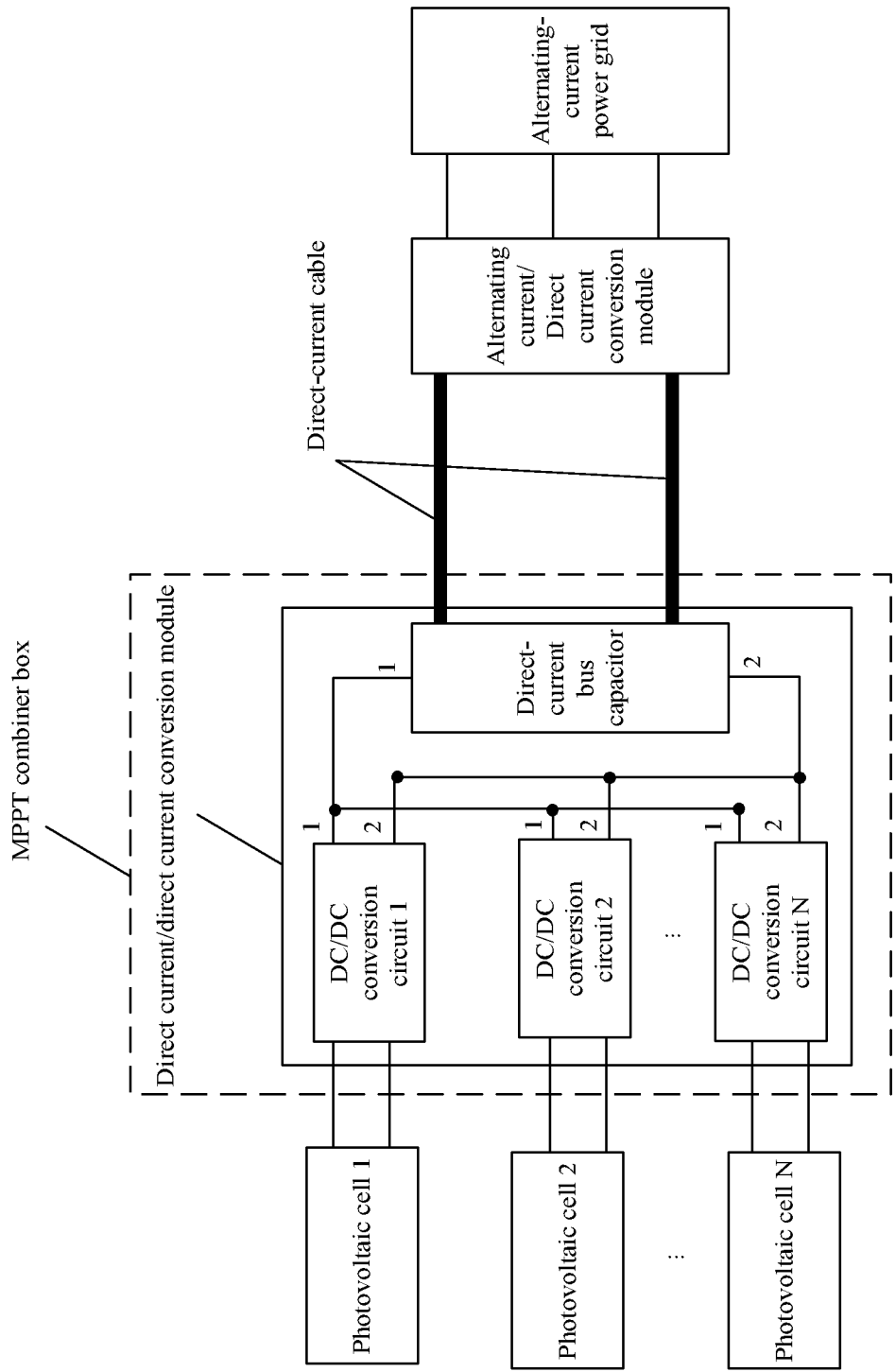
FIG. 8 is a schematic diagram of a structure of still another photovoltaic system.

In another possible design, the photovoltaic system further includes a DC cable and a centralized inverter. As shown in FIG. 8, two input ends of the centralized inverter are separately connected to the first end and the second end of the DC bus capacitor by using the DC cable. The centralized inverter can convert a DC into an AC. The centralized inverter may output the AC to an AC power grid.

The plurality of DC/DC conversion circuits and the DC bus capacitor in the photovoltaic system may form a maximum power point tracking (MPPT) combiner box. The photovoltaic system provided in this embodiment of this disclosure may be a photovoltaic system that is based on the MPPT combiner box and the centralized inverter, and may be applied to an application scenario such as a distributed large photovoltaic power station.

Figure 9:
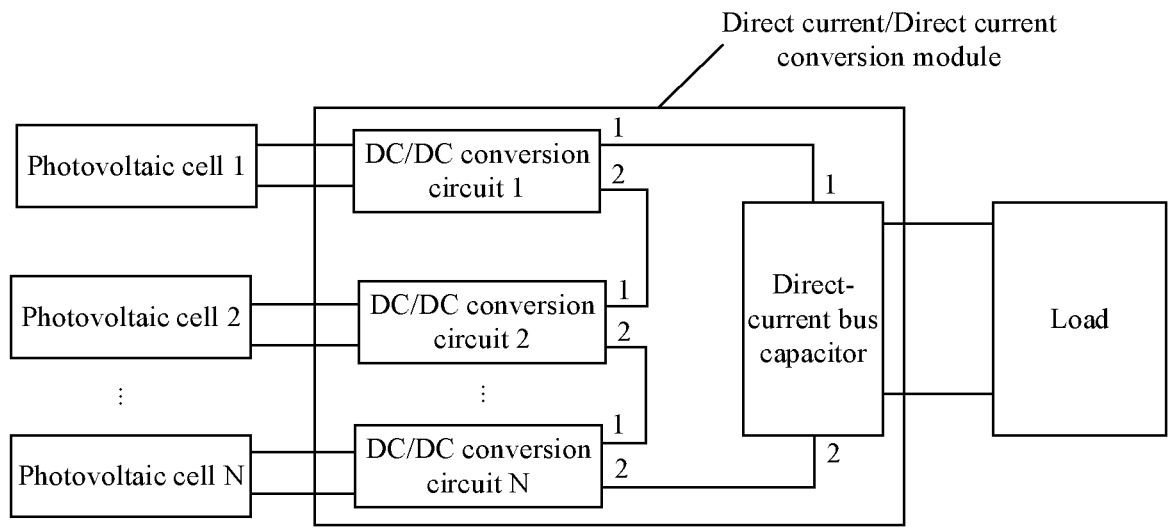
FIG. 9 is a schematic diagram of a structure of still another photovoltaic system.

In still another possible implementation, each photovoltaic cell includes one photovoltaic string. The plurality of photovoltaic cells may be in a one-to-one correspondence with the plurality of DC/DC conversion circuits. The plurality of DC/DC conversion circuits may be sequentially connected in series and then connected to the DC bus capacitor. As shown in FIG. 9, a negative output end of a DC/DC conversion circuit in the plurality of DC/DC conversion circuits is connected to a positive output end of an adjacent DC/DC conversion circuit. A positive output end of a first DC/DC conversion circuit (for example, a DC/DC conversion circuit 1) in the DC/DC conversion circuits is connected to the first end of the DC bus capacitor, and a negative output end of a last DC/DC conversion circuit (for example, a DC/DC conversion circuit N) is connected to the other end of the DC bus capacitor.

In this embodiment of this disclosure, the DC/DC conversion circuit connected to the photovoltaic cell may be implemented as an optimizer or a circuit including an optimizer. The optimizer may be a circuit structure or a topology structure of any existing optimizer. The DC/DC conversion circuit may be any one of a buck circuit, a boost circuit, a buck-boost circuit, a buck-type synchronous rectifier circuit, a boost-type synchronous rectifier circuit, and a buck/boost-type synchronous rectifier circuit. Each DC/DC conversion circuit may adjust a voltage of a photovoltaic cell connected to the DC/DC conversion circuit, that is, adjust a working point of each photovoltaic cell. Each DC/DC conversion circuit may also adjust an output power of the photovoltaic cell connected to the DC/DC conversion circuit.

Figure 10:
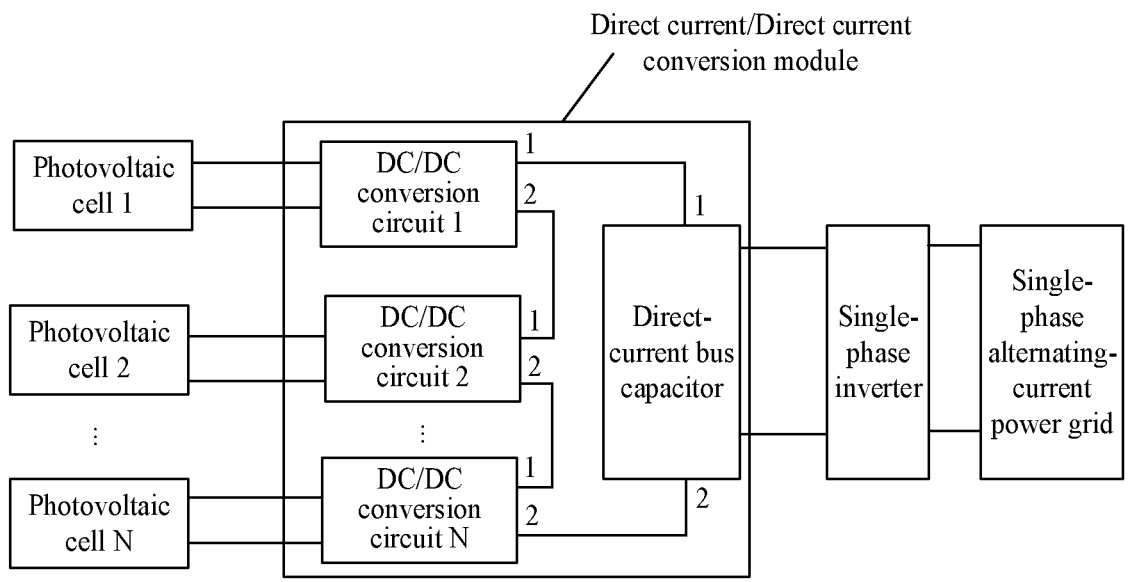
FIG. 10 is a schematic diagram of a structure of still another photovoltaic system.

In a possible design, the photovoltaic system further includes a string inverter. As shown in FIG. 10, two input ends of the string inverter are separately connected to the first end and the second end of the DC bus capacitor. The string inverter may be configured to convert a DC into an AC, and may also supply the AC to an AC power grid. The AC power grid may be a single-phase AC power grid. The photovoltaic system provided in this embodiment of this disclosure may be applied to a home photovoltaic power generation scenario.

The photovoltaic system provided in this embodiment of this disclosure may include a control device. As shown in FIG. 4, the control device may be connected to the DC/DC conversion module. The control device may be configured to control each DC/DC conversion circuit. The control device may also be connected to each DC/DC conversion circuit.

Each DC/DC conversion circuit may receive a signal or an instruction. The signal or the instruction may carry indication information. The DC/DC conversion circuit may adjust, based on the indication information, a voltage between two ends of a photovoltaic cell connected to the DC/DC conversion circuit, or an output power of the photovoltaic cell.

The indication information may be voltage parameter information and/or power parameter information. In an example, the voltage parameter information may be used to indicate the DC/DC conversion circuit to control a voltage provided for both ends of the photovoltaic cell, or indicate the DC/DC conversion circuit to increase or decrease a voltage value based on a voltage provided for both ends of the photovoltaic cell. The power parameter information may be used to indicate the DC/DC conversion circuit to control an actual output power of the photovoltaic cell, or indicate the DC/DC conversion circuit to control the photovoltaic cell to increase or decrease an output power value based on a current output power.

For example, the DC/DC conversion circuit 1 is connected to a photovoltaic cell 1. After receiving the signal or the instruction sent by the control device, the DC/DC conversion circuit 1 may adjust a voltage between two ends of a photovoltaic cell 1 based on voltage parameter information carried in the signal or the instruction. Alternatively, the DC/DC conversion circuit 1 may change a voltage between two ends of the photovoltaic cell 1 based on power parameter information carried in the signal or the instruction, so that the photovoltaic cell 1 outputs an output power corresponding to the power parameter information carried in the signal or the instruction.

The control device may be configured to perform the photovoltaic cell detection method. The photovoltaic system may further include a collection device, configured to obtain infrared image information of a to-be-detected photovoltaic cell, so that the control device can jointly detect, based on at least two pieces of infrared image information of the to-be-detected photovoltaic cell, whether the photovoltaic cell is faulty. As shown in FIG. 4, the control device is connected to a collection device. The control device may control the collection device to collect infrared image information of the photovoltaic cell. The collection device may send the collected infrared image information of the photovoltaic cell to the control device, so that the control device obtains the infrared image information of the photovoltaic cell.

Figure 11:
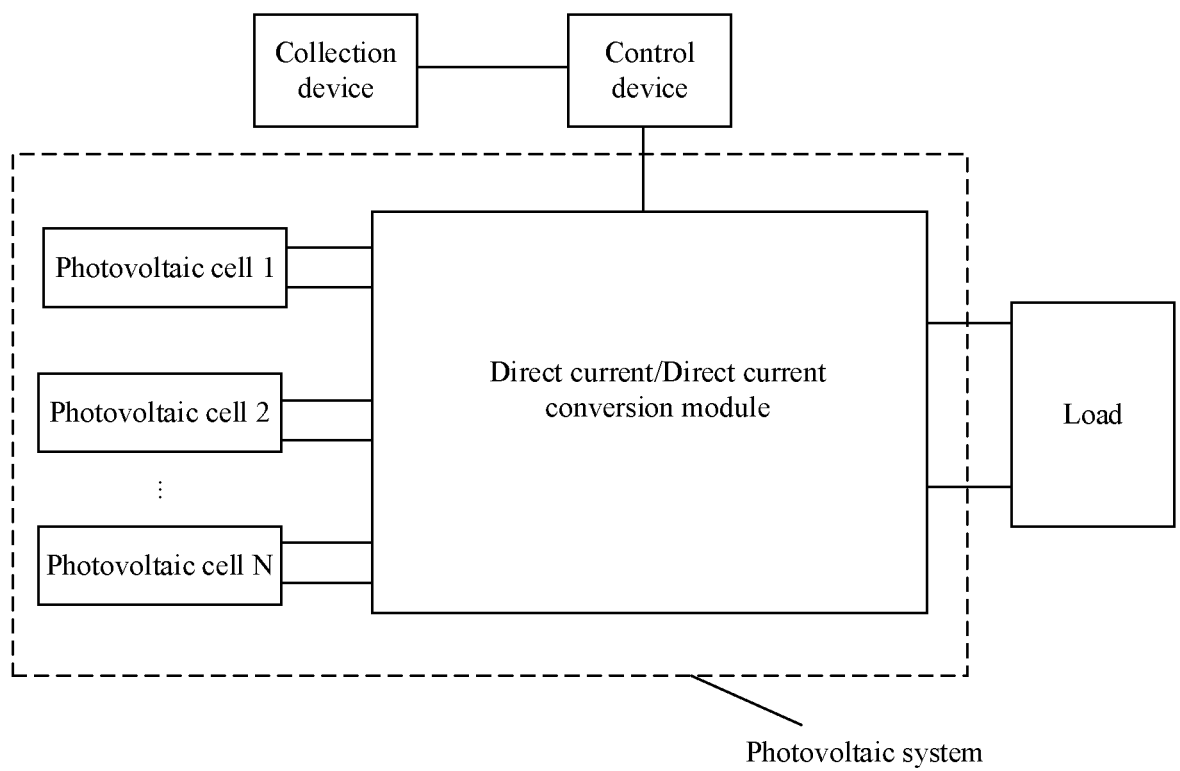
FIG. 11 is a schematic diagram of a structure of still another photovoltaic system.

This disclosure further provides a photovoltaic cell detection system, as shown in FIG. 11. The photovoltaic cell detection system may include a control device, a collection device, and any photovoltaic system provided in embodiments of this disclosure. The photovoltaic cell detection system may be configured to detect whether a photovoltaic cell in the photovoltaic system is faulty. The control device may be configured to perform a photovoltaic cell detection method.

Figure 12:
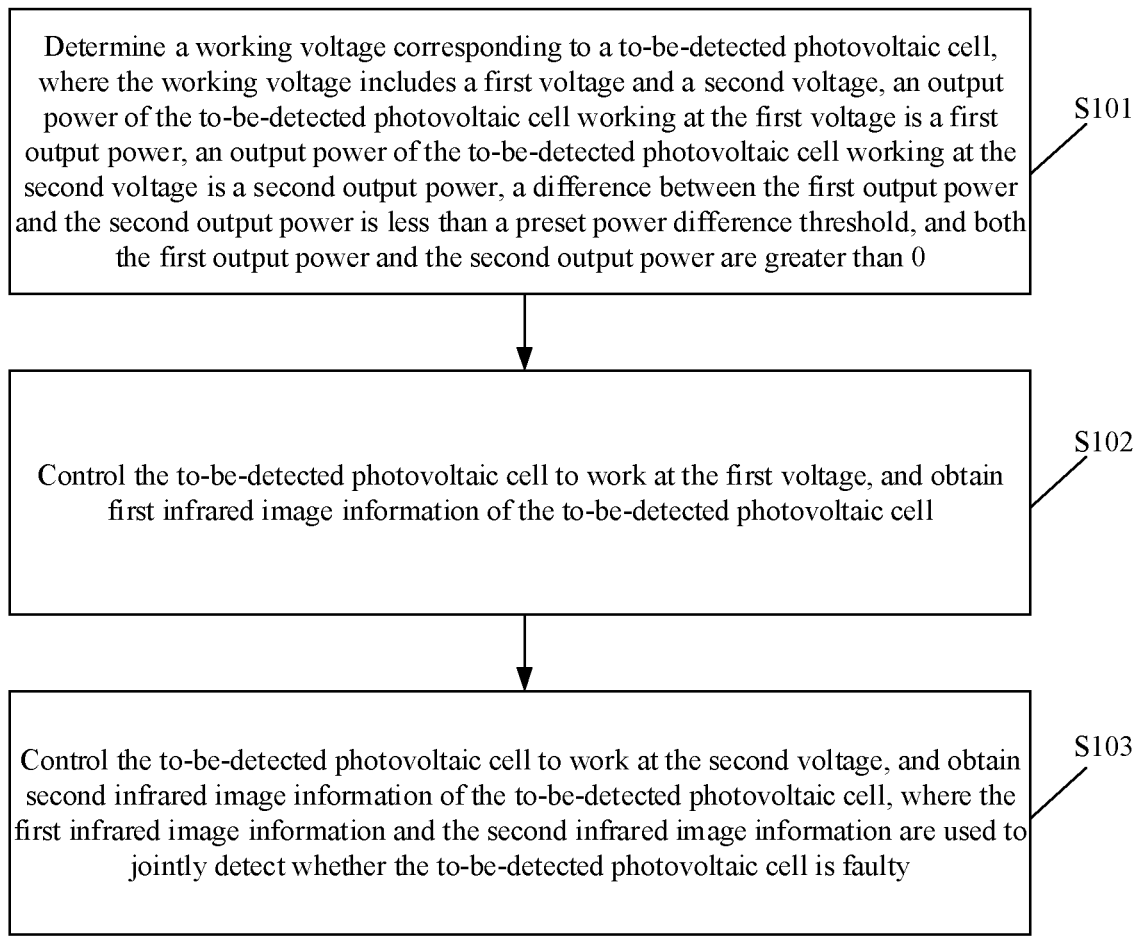
FIG. 12 is a schematic flowchart of a photovoltaic cell detection method.

An embodiment of this disclosure provides a photovoltaic cell detection method that may be applied to a running photovoltaic system. A control device may detect a photovoltaic cell in the photovoltaic system in a running process of the photovoltaic system. The running process of the photovoltaic system may be understood as a process in which the photovoltaic system provides a power for a load or supplies power to the load, and is alternatively referred to as that the photovoltaic system is in a working state. The control device may detect any photovoltaic cell in the photovoltaic system. As shown in FIG. 12, the method may include the following steps:

S101: The control device determines a working voltage corresponding to a to-be-detected photovoltaic cell, where the working voltage includes a first voltage and a second voltage, an output power of the to-be-detected photovoltaic cell working at the first voltage is a first output power, an output power of the to-be-detected photovoltaic cell working at the second voltage is a second output power, a difference between the first output power and the second output power is less than a preset power difference threshold, and both the first output power and the second output power are greater than 0.

S102: The control device controls the to-be-detected photovoltaic cell to work at the first voltage, and obtains first infrared image information of the to-be-detected photovoltaic cell.

S103: Control the to-be-detected photovoltaic cell to work at the second voltage, and obtain second infrared image information of the to-be-detected photovoltaic cell, where the first infrared image information and the second infrared image information are used to jointly detect whether the to-be-detected photovoltaic cell is faulty.

In this embodiment of this disclosure, the control device may control, by controlling a voltage provided by a DC/DC conversion circuit connected to the to-be-detected photovoltaic cell for the to-be-detected photovoltaic cell, the to-be-detected photovoltaic cell to work in a specified voltage state. The control device may control a collection device to collect infrared image information of the to-be-detected photovoltaic cell. Optionally, the control device may include the DC/DC conversion circuit connected to the to-be-detected photovoltaic cell.

The control device may jointly detect, based on at least two pieces of infrared image information of the to-be-detected photovoltaic cell and by using a PL detection method, whether the photovoltaic cell is faulty. The infrared image information of the photovoltaic cell in this embodiment of this disclosure may be a PL image of the photovoltaic cell. When the photovoltaic cell works in an output state (an output power is greater than 0), the photovoltaic cell may transmit an infrared light signal and reflect an infrared light signal in an environment. The infrared image information of the photovoltaic cell may include image information corresponding to the infrared light signal transmitted by the photovoltaic cell and image information corresponding to the reflected infrared light signal in the environment. Generally, in a process of performing PL detection on the photovoltaic cell, the infrared light signal in the environment that is reflected by the photovoltaic cell may be considered as background light noise.

The control device may detect, by using infrared image information of the photovoltaic cell working in different output states, whether the photovoltaic cell is faulty. To be specific, the control device may detect, by using at least two pieces of infrared image information obtained when the photovoltaic cell works at different working points and output powers corresponding to the working points are different, whether the photovoltaic cell is faulty. This may also be referred to as jointly detecting, by using the at least two pieces of infrared image information, whether the photovoltaic cell is faulty.

In an example, the control device may perform differential processing on two PL images of the photovoltaic cell, to obtain image information of the photovoltaic cell from which background light noise is eliminated. The control device may determine, by using any existing PL detection method and by using the image information obtained through the differential processing, whether the photovoltaic cell is faulty.

To avoid a case in which a total output power of a running photovoltaic system fluctuates due to large fluctuation of an output power of the photovoltaic cell caused when the control device obtains at least two PL images of the photovoltaic cell at different working points, the control device may control a working point at which the photovoltaic cell is located when the infrared image information of the photovoltaic cell is obtained, to control the output power of the photovoltaic corresponding to a case in which the infrared image information of the photovoltaic cell is obtained.

The working voltage corresponding to the to-be-detected photovoltaic cell may include the first voltage and the second voltage. The output power of the to-be-detected photovoltaic cell working at the first voltage is the first output power, the output power of the to-be-detected photovoltaic cell working at the second voltage is the second output power, the difference between the first output power and the second output power is less than the preset power difference threshold, and both the first output power and the second output power are greater than 0. The working voltage corresponding to the to-be-detected photovoltaic cell may be preconfigured, or may be determined by the control device in a process of detecting the photovoltaic cell in the photovoltaic system.

The control device controls the to-be-detected photovoltaic cell to work at the first voltage, and an output power of the to-be-detected photovoltaic cell is the first output power corresponding to the first voltage. Alternatively, the control device may control duration in which the to-be-detected photovoltaic cell works at the first voltage to be first duration, or may enable duration in which the to-be-detected photovoltaic cell continuously outputs the first output power to be first duration.

The control device controls the to-be-detected photovoltaic cell to work at the second voltage, and an output power of the to-be-detected photovoltaic cell is the second output power corresponding to the second voltage. Alternatively, the control device may control duration in which the to-be-detected photovoltaic cell works at the second voltage to be second duration, or may enable duration in which the to-be-detected photovoltaic cell continuously outputs the second output power to be second duration. The control device controls the working voltage of the to-be-detected photovoltaic cell, so that output powers obtained when the infrared image information of the to-be-detected photovoltaic cell is obtained are separately the first output power and the second output power, and the difference between the first output power and the second output power is less than the preset power difference threshold. In this embodiment of this disclosure, the preset power difference threshold is a value greater than 0. The difference between the first output power and the second output power may be an absolute value of a result obtained by subtracting the second output power from the first output power. In this design, in the process of detecting the photovoltaic cell, the output power of the detected photovoltaic cell changes slightly, to avoid large fluctuation of the output power of the detected photovoltaic cell, so that fluctuation of a total output power of the photovoltaic system during detection of the photovoltaic cell is avoided.

The control device may determine, based on at least one pre-determined output power corresponding to the to-be-detected photovoltaic cell, the working voltage corresponding to the to-be-detected photovoltaic cell. The at least one output power may include the first output power and the second output power. In other words, the control device may determine, based on the predetermined first output power and/or second output power, the working voltage corresponding to the to-be-detected photovoltaic cell.

It should be understood that the control device determines the at least one output power corresponding to the to-be-detected photovoltaic cell, so that the control device enables, by controlling the working voltage of the to-be-detected photovoltaic cell, the output power of the to-be-detected photovoltaic cell to be the at least one output power corresponding to the to-be-detected photovoltaic cell.

In an example, the first output power is equal to the second output power, that is, the difference between the first output power and the second output power is 0. In other words, the control device may determine a case in which the to-be-detected photovoltaic cell corresponds to one output power. In a process in which the control device obtains the infrared image information obtained when the to-be-detected photovoltaic cell separately works at the first voltage and the second voltage, the output power of the to-be-detected photovoltaic cell remains unchanged. The difference between the first output power and the second output power is 0. Therefore, in the process of detecting the to-be-detected photovoltaic cell, large power fluctuation of the photovoltaic system is avoided.

In a possible implementation, that the control device determines the working voltage corresponding to the to-be-detected photovoltaic cell is also that the control device may determine an output power Ptest corresponding to the to-be-detected photovoltaic cell before an operation of determining the working voltage (the working voltage includes the first voltage and the second voltage) of the to-be-detected photovoltaic cell obtained when the infrared image information of the to-be-detected photovoltaic cell is obtained. For example, the control device may randomly select a power value from a preset power range as the output power Ptest corresponding to the to-be-detected photovoltaic cell obtained when the to-be-detected photovoltaic cell is detected.

Figure 13:
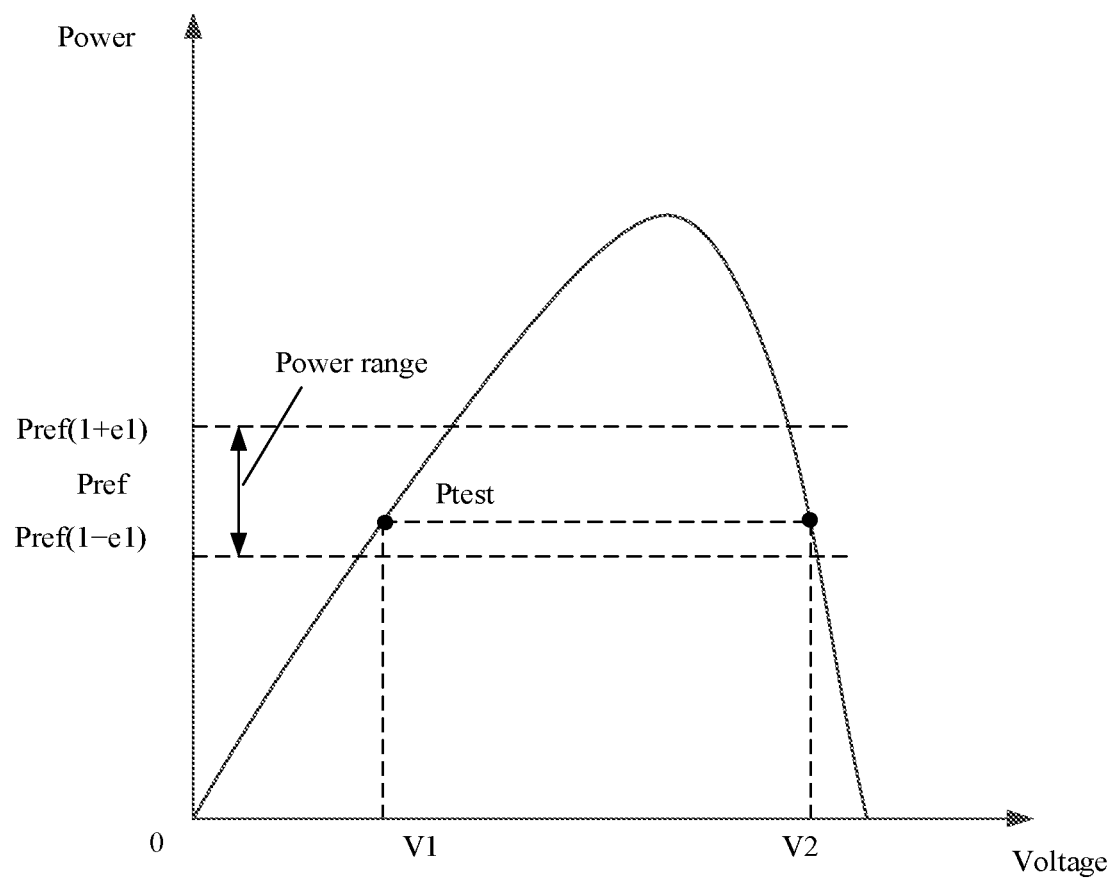
FIG. 13 is a schematic diagram of a relationship between a power and a voltage of a photovoltaic cell.

The preset power range may be determined based on a reference output power value Pref1 of the to-be-detected photovoltaic cell and a first adjustment parameter e1. As shown in FIG. 13, the power range may be [Pref1×(1−e1), Pref1×(1+e1)]. A value of the first adjustment parameter e1 is usually small, for example, e1 may be 5%. The reference output power value Pref1 of the to-be-detected photovoltaic cell may be determined based on a current output power P(t0) of the to-be-detected photovoltaic cell and a preset proportion parameter a. For example, Pref1=P(t0)×a. The reference output power value Pref1 of the to-be-detected photovoltaic cell may also be referred to as a preset output power threshold of the to-be-detected photovoltaic cell. The control device may determine the current output power P(t0) of the to-be-detected photovoltaic cell based on a working voltage U(t0) currently provided for the to-be-detected photovoltaic cell by a DC/DC conversion circuit connected to the to-be-detected photovoltaic cell.

The output power Ptest that is corresponding to the to-be-detected photovoltaic cell and that is determined by the control device may be any value in the preset power range. In this design, when the control device detects the to-be-detected photovoltaic cell, and the output power of the to-be-detected photovoltaic cell is switched from the current output power P(t0) to the output power Ptest, large power fluctuation of the output power of the to-be-detected photovoltaic cell is avoided, so that large fluctuation of the output power of the photovoltaic system is avoided.

Optionally, the preset power range may alternatively be based on the reference output power value Pref1 of the to-be-detected photovoltaic cell. For example, the preset power range may be (0, Pref11], and the output power Ptest corresponding to the to-be-detected photovoltaic cell may be any power value in the preset power range.

Then, the control device may determine, based on a relationship between the output power and the voltage of the photovoltaic cell, a voltage corresponding to the output power Ptest of the to-be-detected photovoltaic cell when the to-be-detected photovoltaic cell is detected, and the voltage is also the working voltage corresponding to the to-be-detected photovoltaic cell, and is also a working point of the to-be-detected photovoltaic cell during detection of.

Optionally, the output power Ptest that is corresponding to the to-be-detected photovoltaic cell and that is determined by the control device may be less than a maximum output power Pmax. Based on the relationship (as shown in FIG. 13) between the output power and the voltage of the photovoltaic cell, the output power Ptest corresponds to two working voltages: the first voltage V1 and the second voltage V2. In this embodiment of the present disclosure, when the to-be-detected photovoltaic cell works at the first voltage, the output power is Ptest, that is, the first output power is Ptest. In addition, the output power is also Ptest when the to-be-detected photovoltaic cell works at the second voltage, that is, the second output power is Ptest.

In another possible implementation, the control device may determine, based on a current output power P(t0) of the to-be-detected photovoltaic cell and a preset proportion parameter a, the output power corresponding to the to-be-detected photovoltaic cell. For example, a product of the current output power P(t0) and the preset proportion parameter a is used as the output power of the to-be-detected photovoltaic cell obtained when the to-be-detected photovoltaic cell is detected, that is, the reference output power value Pref1 of the to-be-detected photovoltaic cell. The control device may determine a voltage corresponding to the reference output power value Pref1 of the to-be-detected photovoltaic cell as the working voltage corresponding to the to-be-detected photovoltaic cell.

In another example, the difference between the first output power and the second output power is greater than 0, and the difference is less than the preset power difference threshold. In other words, the control device may determine a case in which the to-be-detected photovoltaic cell corresponds to two output powers. In the process in which the control device detects the photovoltaic cell, or in other words, in a process of obtaining the infrared image information when the to-be-detected photovoltaic cell separately works at the first voltage and the second voltage, the output power of the to-be-detected photovoltaic cell changes slightly, to avoid power fluctuation. Therefore, in the process of detecting the to-be-detected photovoltaic cell, no large power fluctuation occurs in the photovoltaic system.

In a possible implementation, in an operation in which the control device determines the working voltages (that is, the first voltage and the second voltage) of the to-be-detected photovoltaic cell obtained when the infrared image information of the to-be-detected photovoltaic cell is obtained, the control device may first determine a first target output power and a second target output power obtained when the to-be-detected photovoltaic cell is detected. A difference between the first target output power and the second target output power is less than the preset power difference threshold.

Figure 14:
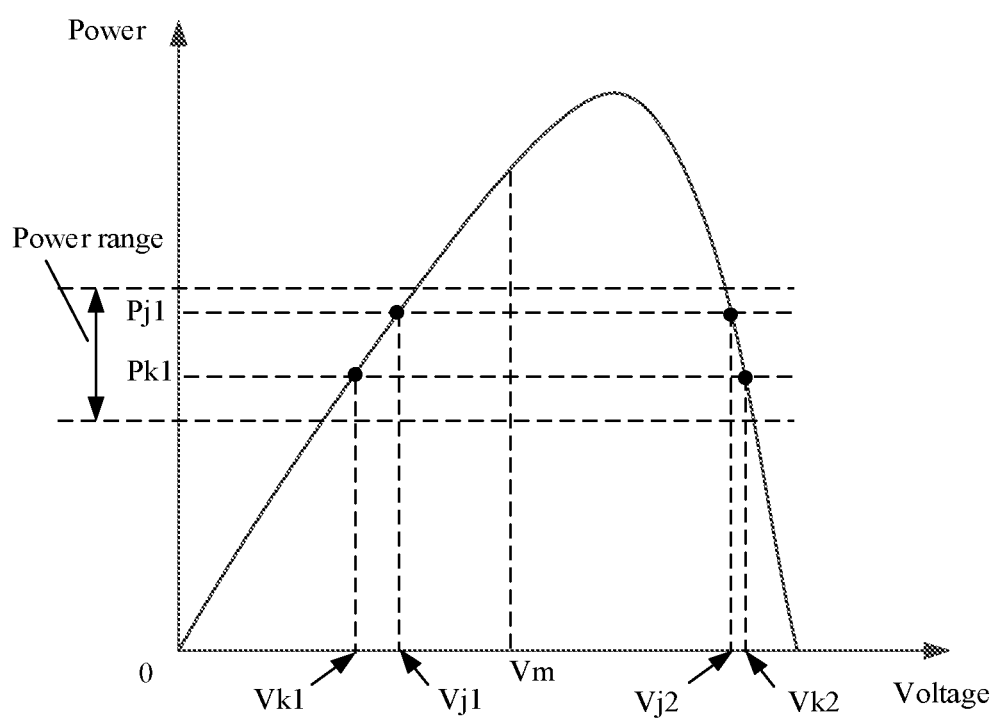
FIG. 14 is a schematic diagram of a relationship between a power and a voltage of a photovoltaic cell.

As shown in FIG. 14, the control device may select any two powers from the preset power range, and use the two powers as the first target output power Pk1 and the second target output power Pj1. The control device determines, based on the relationship between the output power and the voltage of the photovoltaic cell, two voltages corresponding to the first target output power that are separately denoted as Vk1 and Vk2, and two voltages corresponding to the second target output power that are separately denoted as Vj1 and Vj2. The control device may select one of the two voltages (that is, Vk1 and Vk2) corresponding to the first target output power as the first voltage, and select one of the two voltages (that is, Vj1 and Vj2) corresponding to the second target output power as the second voltage.

For example, the voltages corresponding to the first target output power Pk1 are Vk1 and Vk2, and the voltages corresponding to the second target output power Pj1 are Vj1 and Vj2. The control device may compare the voltages corresponding to the first target output power Pk1 and the second target output power Pj1 with a preset threshold Vm. For example, Vm may be a current voltage U(t0) between two ends of the to-be-detected photovoltaic cell, or may be a unique voltage Vm corresponding to a maximum output power Pmax of the photovoltaic cell. In the following descriptions, as an example, Vm is the current voltage between two ends of the to-be-detected photovoltaic cell. FIG. 14 shows a relationship between a power and a voltage of the photovoltaic cell. Both Vk1 and Vj1 are less than Vm, and both Vk2 and Vj2 are greater than Vm.

The control device may use a voltage that is less than Vm and that corresponds to the first target output power Pk1, that is, Vk1, as the first voltage, and use a voltage that is greater than Vm and that corresponds to the second target output power Pj1, that is, Vj2, as the second voltage. Alternatively, the control device may use a voltage that is greater than Vm and that corresponds to the first target output power Pk1, that is, Vk2, as the second voltage, and use a voltage that is less than Vm and that corresponds to the second target output power Pj1, that is, Vj1, as the first voltage.

In some embodiments, the first target output power may be a value less than or equal to the maximum output power, and the second target output power may be a value less than the maximum output power. Alternatively, the second target output power is a value less than or equal to the maximum output power, and the first target output power may be a value less than the maximum output power.

In some possible cases, the preset power range may be determined based on the reference output power Pref1 of the to-be-detected photovoltaic cell and the first adjustment parameter e1, for example, [Pref1×(1−e1), Pref1×(1+e1)].

The control device may control, based on the determined first voltage, the to-be-detected photovoltaic cell to work in a first voltage state, to obtain the first infrared image information, and control, based on the determined second voltage, the to-be-detected photovoltaic cell to work in a second voltage state, to obtain the second infrared image information.

A value of an output power of the to-be-detected photovoltaic cell working in the first voltage state, that is, the first output power, is equal to the first target output power. A value of an output power of the to-be-detected photovoltaic cell working in the second voltage state, that is, the second output power, is equal to the second target output power.

In some possible cases, the control device may randomly select two powers from the preset power range, and the preset power range may be (0, Pref1]. Pref1 may be a preset output power threshold determined based on some test results, or may be determined based on the preset proportion parameter a and a current output power P(t0) of the to-be-detected photovoltaic cell that is obtained before the to-be-detected photovoltaic cell is detected.

The control device may select the first target output power and the second target output power from the preset power range, and determine, from the voltages corresponding to the first target output power and the second target output power, the working voltage corresponding to the to-be-detected photovoltaic cell. In this design, the control device can easily determine, by using the obtained first infrared image information of the to-be-detected photovoltaic cell working in the first voltage state and the obtained second infrared image information of the to-be-detected photovoltaic cell working in the second voltage state, whether the to-be-detected photovoltaic cell is faulty. In other words, a difference between the first infrared image information and the second infrared image information is large, and the control device can easily determine, based on the first infrared image information and the second infrared image information, whether the to-be-detected photovoltaic cell is faulty.

In still another example, the control device may further determine, based on a preset image detection condition, whether the first infrared image information and the second infrared image information of the to-be-detected photovoltaic cell that are obtained by the control device meet the preset image detection condition. The control device may calculate a difference between the first infrared image information and the second infrared image information, to determine image difference information. If the image difference information can be used to determine whether the photovoltaic cell is faulty, the control device may determine that the first infrared image information and the second infrared image information meet the preset image detection condition. If the image difference information cannot be used to determine whether the photovoltaic cell is faulty, the control device may determine that the first infrared image information and the second infrared image information do not meet the preset image detection condition.

If the control device determines that the obtained first infrared image information and second infrared image information of the to-be-detected photovoltaic cell do not meet the preset image detection condition, the control device re-obtains the infrared image information of the to-be-detected photovoltaic cell. Before re-obtaining the infrared image information of the to-be-detected photovoltaic cell, the control device may re-determine the output power obtained when the to-be-detected photovoltaic cell is detected, and the re-determined output power obtained when the to-be-detected photovoltaic cell is detected is less than a previously determined output power. Then, the control device may determine, based on the relationship between the output power and the voltage of the photovoltaic cell, a voltage corresponding to the output power obtained when the photovoltaic cell is detected, and use the voltage as the working voltage obtained when the photovoltaic cell is detected.

After determining that the two pieces of re-obtained infrared image information of the to-be-detected photovoltaic cell meet the preset image detection condition, the control device may determine, based on the two pieces of infrared image information and by using any existing PL detection method, whether the to-be-detected photovoltaic cell is faulty.

In a possible implementation, when detecting the to-be-detected photovoltaic cell, the control device may determine, as the working voltage obtained when the infrared image information of the to-be-detected photovoltaic cell is obtained, a working voltage obtained when infrared image information of a previous detected photovoltaic cell is obtained.

For example, the previous detected photovoltaic cell is a photovoltaic cell 2. Working voltages obtained when infrared image information of the photovoltaic cell 2 is obtained are a third voltage and a fourth voltage, and the obtained infrared image information of the photovoltaic cell 2 may be used to determine whether the photovoltaic cell 2 is faulty. The control device may determine the third voltage and the fourth voltage as working voltages corresponding to the to-be-detected photovoltaic cell obtained when the infrared image information of the to-be-detected photovoltaic cell is obtained.

In still another example, when the control device detects the to-be-detected photovoltaic cell, a current output power of the to-be-detected photovoltaic cell is P(t0). In the process of detecting the to-be-detected photovoltaic cell, the first output power of the to-be-detected photovoltaic cell working in the first voltage state and the second output power of the to-be-detected photovoltaic cell working in the second voltage state may be values close to P(t0).

To stabilize a total output power of the photovoltaic system during the detection of the photovoltaic cell, the control device may determine a power adjustment amount of at least one first photovoltaic cell based on the current output power P(t0) of the to-be-detected photovoltaic cell, the first output power of the to-be-detected photovoltaic cell in the first voltage state, and the second output power of the to-be-detected photovoltaic cell working in the second voltage state. The first photovoltaic cell is a photovoltaic cell other than the to-be-detected photovoltaic cell in the plurality of photovoltaic cells. The control device adjusts an output power of the first photovoltaic cell based on the determined power adjustment amount corresponding to the first photovoltaic cell.

If the first output power is equal to the second output power, the control device may determine a total power adjustment amount based on the current output power P(t0) of the to-be-detected photovoltaic cell and the first output power. If the first output power is not equal to the second output power, the control device may determine a total power adjustment amount based on the current output power P(t0) of the to-be-detected photovoltaic cell and the first output power, or the control device may determine a total power adjustment amount based on the current output power P(t0) of the to-be-detected photovoltaic cell and the second output power.

Then, the control device may select at least one first photovoltaic cell, and determine, based on the total power adjustment amount, a power adjustment amount corresponding to each of the selected at least one first photovoltaic cell. The control device adjusts an output power of each first photovoltaic cell based on the power adjustment amount corresponding to each of the at least one first photovoltaic cell.

For example, a power adjustment amount corresponding to a photovoltaic cell 3 is pt. The control device may determine, based on a current output power PC of the photovoltaic cell 3 and the power adjustment amount pt, that a target output power of the photovoltaic cell 3 is PC+pt. The control device may determine, based on a preset correspondence between a power and a voltage of a photovoltaic cell, that voltages corresponding to the target output power PC+pt of the photovoltaic cell 3 are VC1 and VC2. The control device may control the photovoltaic cell 3 to work in a VC1 or VC2 state, so that an output power of the photovoltaic cell 3 is adjusted to PC+pt.

In a possible implementation, the control device may determine a total target output power of the photovoltaic system based on the reference output power value Pref1 of the to-be-detected photovoltaic cell and a current output power of each photovoltaic cell other than the to-be-detected photovoltaic cell in the plurality of photovoltaic cells.

For example, the control device may determine, based on the current output power of each photovoltaic cell other than the to-be-detected photovoltaic cell in the plurality of photovoltaic cells, a total output power of photovoltaic cells other than the to-be-detected photovoltaic cell in the plurality of photovoltaic cells. The control device may determine a sum of the reference output power value Pref1 of the to-be-detected photovoltaic cell and the total output power of the photovoltaic cells other than the to-be-detected photovoltaic cell in the plurality of photovoltaic cells as a total target output power Ptotal of the photovoltaic system.

In some embodiments, during obtaining of the infrared image information of the to-be-detected photovoltaic cell, the output power of the to-be-detected photovoltaic cell is determined based on the reference output power value Pref1, or is determined from the preset power range determined based on the reference output power value Pref1. Therefore, during obtaining of the infrared image information of the to-be-detected photovoltaic cell, a difference between the output power of the to-be-detected photovoltaic cell and the reference output power value Pref1 is small, or the power changes slightly.

The control device maintains the total output power of the photovoltaic system when detecting the photovoltaic cell in the running photovoltaic system. In this way, not only can large power fluctuation of the output power of the photovoltaic system be avoided, but the photovoltaic system can also have a stable total output power.

In a possible design, when maintaining the total output power of the photovoltaic system, the control device may determine, based on a preset power adjustment threshold and the total target output power, a total power adjustment amount of second photovoltaic cells other than the to-be-detected photovoltaic cell in the plurality of photovoltaic cells.

For example, the total output power Ptotal may be any value in a preset total output power range. The preset total output power range may be based on a second adjustment parameter e2 and a total target output power Pref2. For example, the preset total output power range may be [Pref2×(1−e2), Pref2×(1+e2)]. When detecting any photovoltaic cell, the control device may maintain the total output power of the photovoltaic system within the preset total output power range.

For another example, before the control device controls the to-be-detected photovoltaic cell to work at the first voltage or the second voltage, the control device determines, based on a second adjustment parameter e2 and a total target output power Pref2, that a range of the total power adjustment amount is [0, 2Pref2×e2]. The control device may select any value from the range of the total power adjustment amount as the total power adjustment amount of the second photovoltaic cells other than the to-be-detected photovoltaic cell in the plurality of photovoltaic cells.

The control device may further determine, based on the total power adjustment amount, a power adjustment amount corresponding to at least one second photovoltaic cell. Then, the control device may perform power adjustment on the at least one second photovoltaic cell. For example, a power adjustment amount corresponding to a photovoltaic cell 4 is pw. The control device may determine, based on a current output power PD of the photovoltaic cell 4 and the power adjustment amount pw, that a target output power of the photovoltaic cell 4 is PD+pw. The control device may determine, based on a preset correspondence between a power and a voltage of a photovoltaic cell, that voltages corresponding to the target output power PD+pw of the photovoltaic cell 4 are VD1 and VD2. The control device may control the photovoltaic cell 4 to work in a VD1 or VD2 state, so that an output power of the photovoltaic cell 4 is PD+pw.

Figure 15:
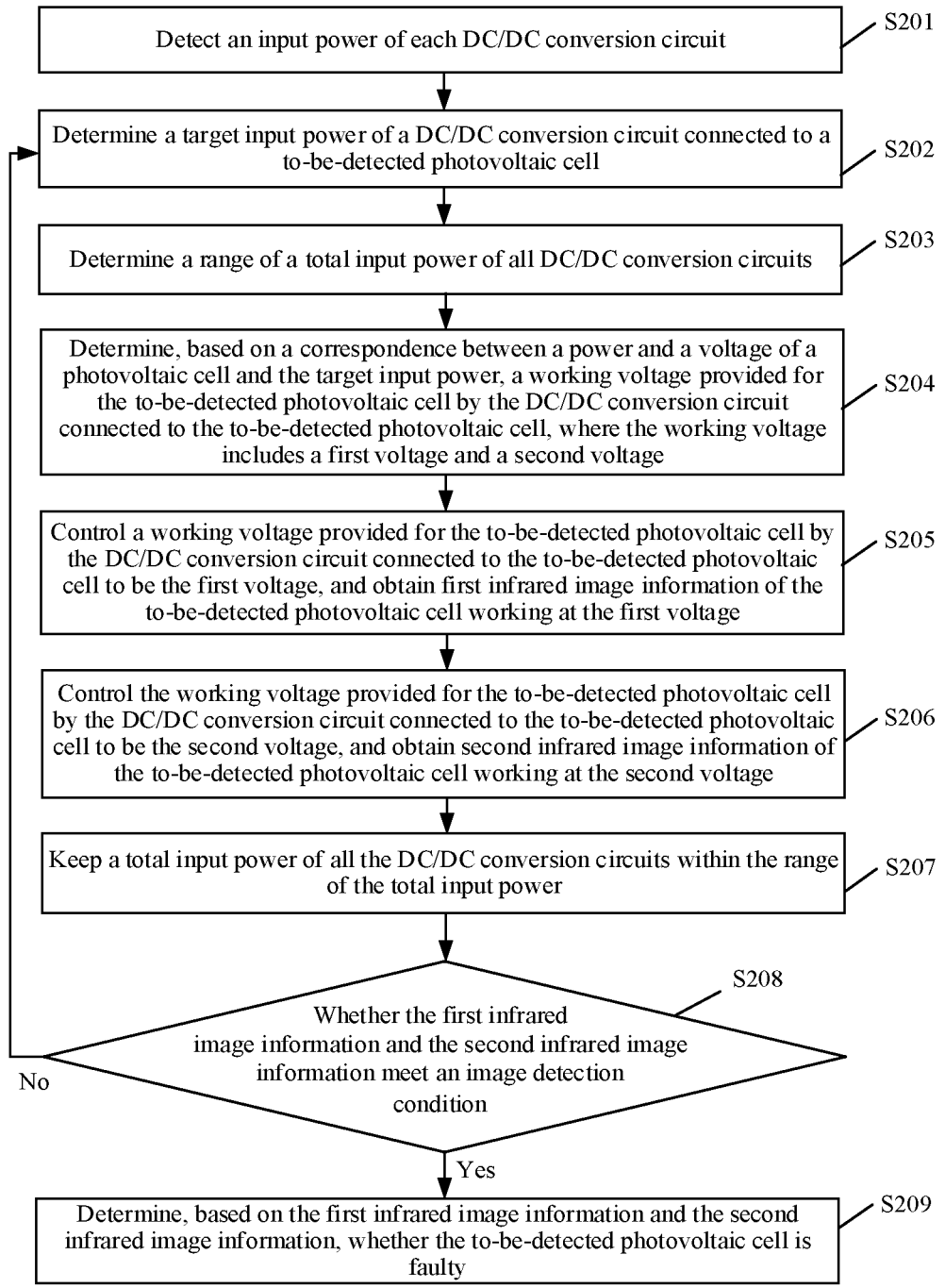
FIG. 15 is a schematic flowchart of another photovoltaic cell detection method.

An embodiment of this disclosure further provides a photovoltaic cell detection method. The method may be performed by a control device. The photovoltaic system includes a plurality of photovoltaic cells and a DC/DC conversion module. The DC/DC conversion module includes a plurality of DC/DC conversion circuits. The plurality of photovoltaic cells is in a one-to-one correspondence with the plurality of DC/DC conversion circuits. Each photovoltaic cell is connected to a corresponding DC/DC conversion circuit. The control device is connected to the DC/DC conversion module, and the control device may be connected to each DC/DC conversion circuit, to control a voltage provided by the DC/DC conversion circuit for a connected photovoltaic cell. The voltage provided by the DC/DC conversion circuit for the connected photovoltaic cell is also a voltage at an input end of the DC/DC conversion circuit, and is denoted as an input voltage. The connected photovoltaic cell forms a current under the voltage applied by the DC/DC conversion circuit, and inputs the current to the DC/DC conversion circuit. In this way, the photovoltaic cell converts optical energy into electric energy. An output power corresponding to the DC/DC conversion circuit to which the current generated by the photovoltaic cell is input is also an input power corresponding to the DC/DC conversion circuit. The control device is connected to a collection device, and may control the collection device to collect infrared image information of the photovoltaic cell. As shown in FIG. 15, the method may include the following steps.

S201: The control device detects an input power of each DC/DC conversion circuit.

An input voltage of each DC/DC conversion circuit is also a voltage between two ends of a photovoltaic cell connected to the DC/DC conversion circuit, and is also an output voltage of the photovoltaic cell. The input power of each DC/DC conversion circuit is an output power of the photovoltaic cell connected to the DC/DC conversion circuit.

It is assumed that the DC/DC conversion module includes N DC/DC conversion circuits. A to-be-detected photovoltaic cell may be any one of a plurality of photovoltaic cells, and a DC/DC conversion circuit connected to the to-be-detected photovoltaic cell may be denoted as a $k^{th}$ DC/DC conversion circuit.

In a possible implementation, the control device may perform the operations of step S201 to step S209 in response to a received photovoltaic cell detection instruction. The photovoltaic cell detection instruction may be a detection instruction for a to-be-detected photovoltaic cell k. The photovoltaic cell detection instruction may carry a preset proportion parameter a corresponding to the $k^{th}$ DC/DC conversion circuit connected to the to-be-detected photovoltaic cell.

The photovoltaic cell detection instruction may be triggered by an instruction input module provided by the control device, or may be sent by another terminal to the control device. For example, the other terminal may be a host computer.

S202: The control device determines a target input power of the DC/DC conversion circuit connected to the to-be-detected photovoltaic cell.

Before obtaining infrared image information of the to-be-detected photovoltaic cell, the control device determines an output power of the to-be-detected photovoltaic cell obtained when the infrared image information of the to-be-detected photovoltaic cell is obtained, that is, an input power of the $k^{th}$ DC/DC conversion circuit. In this embodiment of this disclosure, the input power of the $k^{th}$ DC/DC conversion circuit obtained when the infrared image information of the to-be-detected photovoltaic cell is obtained is denoted as the target input power.

The control device may select one or two power values from a power range corresponding to the $k^{th}$ DC/DC conversion circuit as the target input power. The power range corresponding to the $k^{th}$ DC/DC conversion circuit may be determined based on a reference input power Pref1 (which is also a reference output power of the to-be-detected photovoltaic cell) of the $k^{th}$ DC/DC conversion circuit and a first adjustment parameter e1, for example, [Pref1×(1−e1), Pref1×(1+e1)]. For example, the first adjustment parameter e1 may be 5%.

The reference input power Pref1 of the $k^{th}$ DC/DC conversion circuit may be determined based on a current input power Pk(t0) of the DC/DC conversion circuit and the preset proportion parameter a, for example, the reference input power Pref1=Pk(t0)×a. For example, when a may be 50%, the reference input power Pref1 is 0.5Pk(t0).

In a possible implementation, if the to-be-detected photovoltaic cell is not a first detected photovoltaic cell, the control device may determine, as a target input power of the $k^{th}$ DC/DC conversion circuit, a target input power of a DC/DC conversion circuit corresponding to a latest detected photovoltaic cell.

S203: The control device determines a range of a total input power of all DC/DC conversion circuits.

In a process of detecting a photovoltaic cell in a photovoltaic system, the control device may ensure that the total input power Ptotal of all the DC/DC conversion circuits is within a specific range, to avoid large fluctuation of a total output power of the photovoltaic system.

The control device may determine the range of the total input power based on a reference value Pref2 for the total input power and a second adjustment parameter e2. For example, the range of the total input power may be [Pref2×(1−e2), Pref2×(1+e2)]. For example, e2 may be 10%. The reference value Pref2 for the total input power may be determined based on an input power of each DC/DC conversion circuit other than the $k^{th}$ DC/DC conversion circuit and the target input power of the $k^{th}$ DC/DC conversion circuit, for example, Pref2 may be a value less than or equal to $\Sigma_{j=1, 2, 3, \ldots, N j \neq k} Pj(t0)+Pk(t0)$.

S204: The control device determines, based on a correspondence between a power and a voltage of a photovoltaic cell and the target input power, a working voltage provided for the to-be-detected photovoltaic cell by the DC/DC conversion circuit connected to the to-be-detected photovoltaic cell, where the working voltage includes a first voltage and a second voltage.

If the control device selects a power value from the power range corresponding to the $k^{th}$ DC/DC conversion circuit as a target input power value, two voltages corresponding to the target input power value are used, based on the correspondence between a power and a voltage of a photovoltaic cell, as a working voltage provided by the $k^{th}$ DC/DC conversion circuit for the to-be-detected photovoltaic cell when the infrared image information of the to-be-detected photovoltaic cell is obtained.

If the control device selects two power values from the power range corresponding to the $k^{th}$ DC/DC conversion circuit as target input power values, based on the correspondence between a power and a voltage of a photovoltaic cell, a first power value corresponds to two voltage values, and a second power value corresponds to two voltage values. The control device selects, from the four voltage values corresponding to the first power value and the second power value, a voltage value less than an input voltage Uk(t0) of the $k^{th}$ DC/DC conversion circuit as the first voltage, and selects a voltage value greater than the input voltage Uk(t0) of the $k^{th}$ DC/DC conversion circuit as the second voltage. The control device may alternatively select, from the four voltages corresponding to the first power value and the second power value, a voltage value less than a voltage corresponding to a maximum input power of the $k^{th}$ DC/DC conversion circuit as the first voltage, and select a voltage value greater than the voltage corresponding to the maximum input power of the $k^{th}$ DC/DC conversion circuit as the second voltage.

S205: The control device controls a working voltage provided for the to-be-detected photovoltaic cell by the DC/DC conversion circuit connected to the to-be-detected photovoltaic cell to be the first voltage, and obtains first infrared image information of the to-be-detected photovoltaic cell working at the first voltage.

The control device may control the working voltage provided by the $k^{th}$ DC/DC conversion circuit for the to-be-detected photovoltaic cell to be the first voltage, or may control the $k^{th}$ DC/DC conversion circuit to be at a first working point, the to-be-detected photovoltaic cell to work at the first voltage, or the to-be-detected photovoltaic cell to be at a first working point.

The control device may control duration in which the working voltage provided by the $k^{th}$ DC/DC conversion circuit for the to-be-detected photovoltaic cell is the first voltage to be first duration T1, so that duration in which the to-be-detected photovoltaic cell can work at the first voltage is the first duration T1. The control device may further control the collection device to collect the infrared image information of the to-be-detected photovoltaic cell working at the first voltage. For example, the first duration T1 may be 100 milliseconds.

S206: The control device controls the working voltage provided for the to-be-detected photovoltaic cell by the DC/DC conversion circuit connected to the to-be-detected photovoltaic cell to be the second voltage, and obtains second infrared image information of the to-be-detected photovoltaic cell working at the second voltage.

The control device may control the working voltage provided by the $k^{th}$ DC/DC conversion circuit for the to-be-detected photovoltaic cell to be the second voltage, or may control the $k^{th}$ DC/DC conversion circuit to be at a second working point, the to-be-detected photovoltaic cell to work at the second voltage, or the to-be-detected photovoltaic cell to be at a second working point.

The control device may control duration in which the working voltage provided by the $k^{th}$ DC/DC conversion circuit for the to-be-detected photovoltaic cell is the second voltage to be second duration T2, so that duration in which the to-be-detected photovoltaic cell can work at the second voltage is the second duration T2. The control device may further control the collection device to collect the infrared image information of the to-be-detected photovoltaic cell working at the second voltage. For example, the second duration T2 may be 120 milliseconds.

In this embodiment of this disclosure, the control device may first perform an operation corresponding to step S205, and then perform an operation corresponding to step S206; or the control device may first perform an operation corresponding to step S206, and then perform an operation corresponding to step S205.

Figure 16:
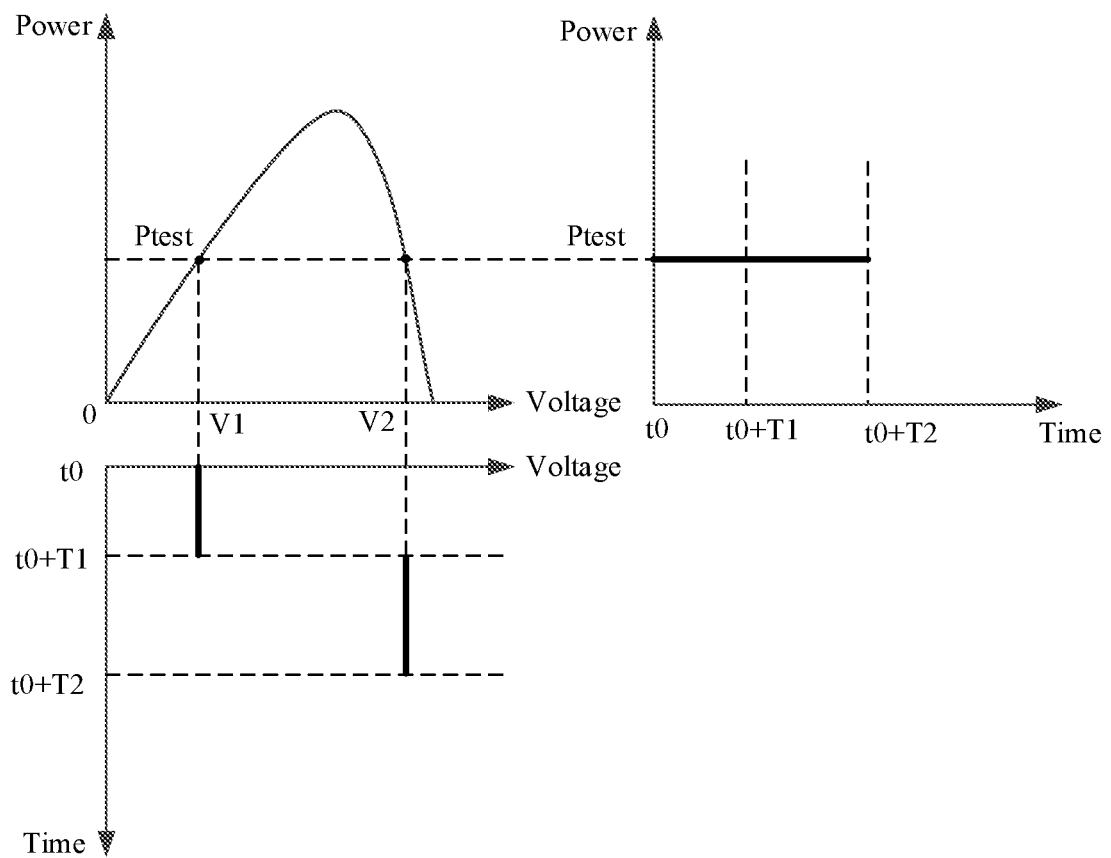
FIG. 16 is a schematic diagram of a relationship between a voltage between two ends of a photovoltaic cell, an output power, and time in a process of detecting the photovoltaic cell.

Based on some embodiments, the control device selects a power value from the power range corresponding to the $k^{th}$ DC/DC conversion circuit as a target input power value Pm. As shown in FIG. 16, based on the correspondence between a power and a voltage of a photovoltaic cell, two voltages (Vm1 and Vm2) corresponding to the target input power value Pm are used as working voltages provided by the $k^{th}$ DC/DC conversion circuit for the to-be-detected photovoltaic cell when the infrared image information of the to-be-detected photovoltaic cell is obtained.

The control device controls duration in which the to-be-detected photovoltaic cell works at Vm1 to be the first duration T1, and controls the collection device to collect the infrared image information of the to-be-detected photovoltaic cell. The control device controls duration in which the to-be-detected photovoltaic cell works at Vm2 to be the second duration T2, and controls the collection device to collect the infrared image information of the to-be-detected photovoltaic cell. Based on a relationship between an output power of the to-be-detected photovoltaic cell and time in FIG. 16, it can be learned that the output power of the to-be-detected photovoltaic cell is stabilized at Pm in a process in which the control device detects the to-be-detected photovoltaic cell.

S207: The control device keeps a total input power of all the DC/DC conversion circuits within the range of the total input power.

The control device may detect an input power of each DC/DC conversion circuit in real time. If the total input power Ptotal of all the DC/DC conversion circuits is not in the range of the total input power, for example, Ptotal is less than a minimum power value Pmin in the range of the total input power, the control device increases an input power of at least one DC/DC conversion circuit other than the $k^{th}$ DC/DC conversion circuit by Pmin-Ptotal, so that an adjusted total input power Ptotal' of all the DC/DC conversion circuits falls within the range of the total input power. For another example, if Ptotal is greater than a maximum power Pmax in the range of the total input power, the control device decreases the input power of the at least one DC/DC conversion circuit other than the $k^{th}$ DC/DC conversion circuit by Ptotal-Pmax, so that an adjusted total input power Ptotal' of all the DC/DC conversion circuits falls within the range of the total input power.

The control device may synchronously perform operations of step S207 and step S206, or may synchronously perform operations of step S207 and step S205.

Figure 17:
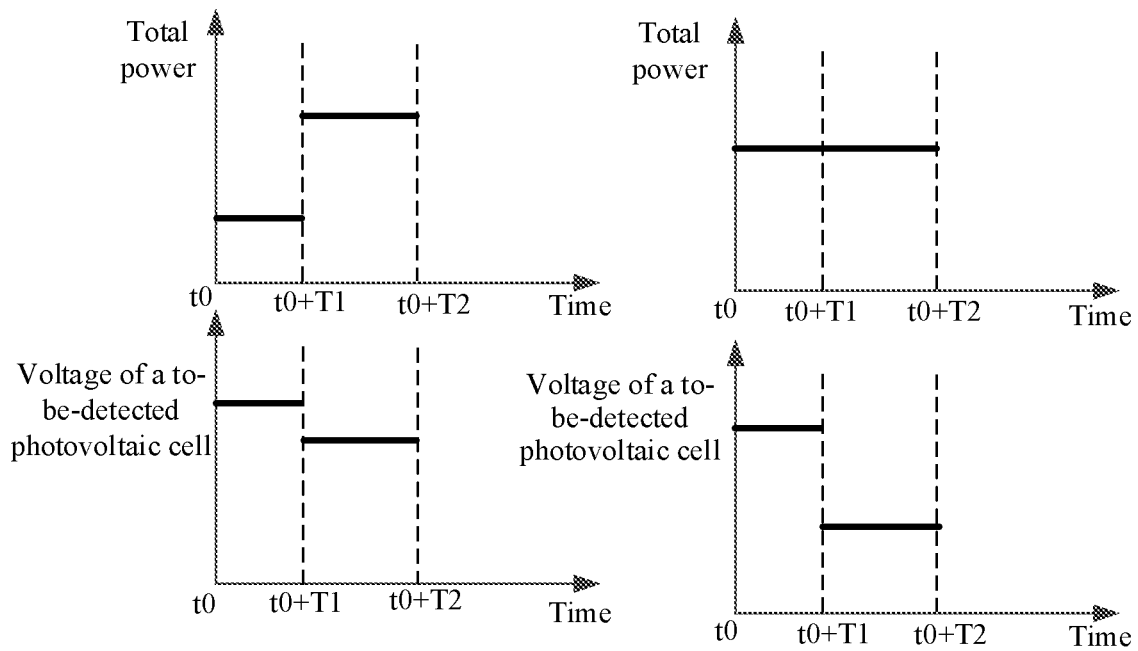
FIG. 17 is a schematic diagram of a relationship between a total power of a photovoltaic system and a voltage between two ends of a to-be-detected photovoltaic cell in a process of detecting a photovoltaic cell.

Based on some embodiments, a right part of FIG. 17 shows a relationship between the total input power Ptotal of all the DC/DC conversion circuits and time in the process in which the control device detects the to-be-detected photovoltaic cell, that is, in a process in which the control device controls the to-be-detected photovoltaic cell to work at the first voltage and controls the to-be-detected photovoltaic cell to work at the second voltage. A left part in FIG. 17 shows a relationship between the total input power of all the DC/DC conversion circuits and time in a process of determining a status of health of the photovoltaic cell at night by using an EL detection method. In this embodiment of this disclosure, when detecting the photovoltaic cell, the control device may keep, through closed-loop control, the total input power of all the DC/DC conversion circuits to be basically stable, to ensure that a total output power of the photovoltaic system to be basically stable, and further avoid impact to electric energy quality during grid connection in a scenario in which the photovoltaic system supplies power to a power grid.

S208: The control device determines whether the first infrared image information and the second infrared image information meet an image detection condition; and if yes, performs step S209 next, or if no, performs step S202 next.

The control device may determine whether an image obtained by performing differential processing on the first infrared image information and the second infrared image information can be used to determine whether the to-be-detected photovoltaic cell is faulty. Generally, when there is a large difference between the first infrared image information and the second infrared image information, the control device may determine, based on the image obtained by performing differential processing on the first infrared image information and the second infrared image information, whether the to-be-detected photovoltaic cell is faulty; and when the difference between the first infrared image information and the second infrared image information is small, the control device cannot determine, based on the image obtained by performing differential processing on the first infrared image information and the second infrared image information, whether the to-be-detected photovoltaic cell is faulty. The control device may determine, based on the determined difference between the first infrared image information and the second infrared image information, whether the first infrared image information and the second infrared image information meet the image detection condition. If the difference is large, the first infrared image information and the second infrared image information meet the image detection condition; or if the difference is small, the first infrared image information and the second infrared image information do not meet the image detection condition.

If the control device determines that the first infrared image information and the second infrared image information meet the image detection condition, the control device may determine, based on the first infrared image information and the second infrared image information, whether the to-be-detected photovoltaic cell is faulty.

If the control device determines that the first infrared image and the second infrared image information do not meet the image detection condition, the control device may re-determine the target input power, obtained when the infrared image information of the to-be-detected photovoltaic cell is obtained, of the DC/DC conversion circuit connected to the to-be-detected photovoltaic cell, re-obtain the infrared image information of the to-be-detected photovoltaic cell, and perform step S202 next.

In the current process of detecting the to-be-detected photovoltaic cell, when the control device performs the operation of step S202 again, the control device determines again that the target input power of the $k^{th}$ DC/DC conversion circuit needs to be less than a latest determined target input power of the $k^{th}$ DC/DC conversion circuit.

S209: The control device determines, based on the first infrared image information and the second infrared image information, whether the to-be-detected photovoltaic cell is faulty.

The control device may determine, by using any existing PL detection method and by using the first infrared image information and the second infrared image information, whether the to-be-detected photovoltaic cell is faulty. This is not excessively limited in this disclosure.

Figure 18:
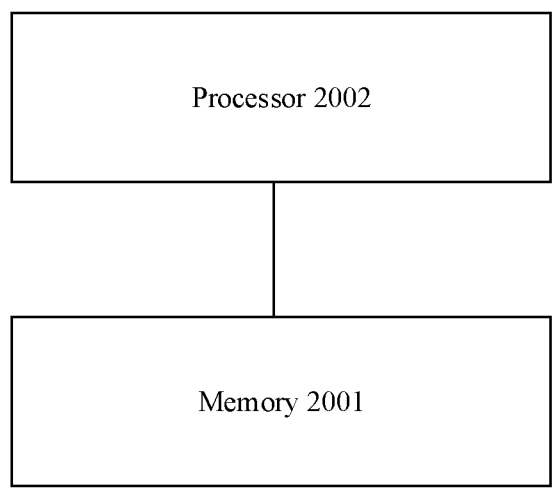
FIG. 18 is a schematic diagram of a structure of a photovoltaic cell detection apparatus.

An embodiment of this disclosure further provides a photovoltaic cell detection apparatus. As shown in FIG. 18, the apparatus includes a memory 2001 and a processor 2002.

The memory 2001 may be configured to store a program, instructions, or code. The processor 2002 may invoke the program, the instructions, or the code stored in the memory 2001, to perform any photovoltaic cell detection method provided in embodiments of this disclosure.

In an example, the processor 2002 may perform the following operations: determining a working voltage corresponding to a to-be-detected photovoltaic cell, where the working voltage includes a first voltage and a second voltage, an output power of the to-be-detected photovoltaic cell working at the first voltage is a first output power, an output power of the to-be-detected photovoltaic cell working at the second voltage is a second output power, a difference between the first output power and the second output power is less than a preset power difference threshold, and both the first output power and the second output power are greater than 0; controlling the to-be-detected photovoltaic cell to work at the first voltage, and obtaining first infrared image information of the to-be-detected photovoltaic cell; and controlling the to-be-detected photovoltaic cell to work at the second voltage, and obtaining second infrared image information of the to-be-detected photovoltaic cell, where the first infrared image information and the second infrared image information are used to jointly detect whether the to-be-detected photovoltaic cell is faulty.

In a possible implementation, both the first output power and the second output power are less than a preset output power threshold.

In a possible implementation, the preset output power threshold is a maximum power point of the photovoltaic cell.

In a possible implementation, the first voltage is less than or equal to a voltage corresponding to the photovoltaic cell at the maximum power point, and the second voltage is greater than the voltage corresponding to the photovoltaic cell at the maximum power point.

In a possible implementation, the first output power is equal to the second output power, and the first voltage is not equal to the second voltage.

In a possible implementation, the processor 2002 is further configured to: before determining the working voltage corresponding to the to-be-detected photovoltaic cell, determine a third output power corresponding to the to-be-detected photovoltaic cell.

When determining the working voltage corresponding to the to-be-detected photovoltaic cell, the processor 2002 is configured to: determine, based on a correspondence between output powers of the to-be-detected photovoltaic cell at different voltages, a voltage corresponding to the third output power as the working voltage corresponding to the to-be-detected photovoltaic cell.

In a possible implementation, when determining the third output power corresponding to the to-be-detected photovoltaic cell, the processor 2002 is configured to: determine the third output power based on a preset proportion parameter and a current output power of the to-be-detected photovoltaic cell; select a power from a preset power range as the third output power, where the preset power range is determined based on a first adjustment parameter and a power reference value corresponding to the to-be-detected photovoltaic cell, and the power reference value corresponding to the to-be-detected photovoltaic cell is determined based on the preset proportion parameter and the current output power of the to-be-detected photovoltaic cell; if a photovoltaic system includes a plurality of photovoltaic cells, determine, as the third output power, an output power of a previous detected photovoltaic corresponding to a case in which infrared image information that is of the previous detected photovoltaic cell and that meets a preset image detection condition is obtained; or if latest obtained infrared image information of the to-be-detected photovoltaic cell does not meet a preset image detection condition, determine a fourth output power as the third output power, where the fourth output power is less than an output power of the to-be-detected photovoltaic corresponding to a case in which the latest obtained infrared image information of the to-be-detected photovoltaic cell is obtained.

In a possible implementation, the processor 2002 is further configured to: if the first infrared image information and the second infrared image information do not meet the preset image detection condition, re-determine the working voltage corresponding to the to-be-detected photovoltaic cell.

In a possible implementation, the system further includes a DC/DC conversion module, and the to-be-detected photovoltaic cell is connected to the DC/DC conversion module.

When controlling the to-be-detected photovoltaic cell to work at the first voltage, the processor 2002 is configured to: send, to the DC/DC conversion module, a first control command that carries first indication information, where the first indication information indicates the DC/DC conversion module to enable the to-be-detected photovoltaic cell to output the first voltage.

The controlling the to-be-detected photovoltaic cell to work at the second voltage includes: sending, to the DC/DC conversion module, a second control command that carries second indication information, where the second indication information indicates the DC/DC conversion module to enable the to-be-detected photovoltaic cell to output the second voltage.

In a possible implementation, the photovoltaic system includes a plurality of photovoltaic cells, and the to-be-detected photovoltaic cell is any one of the plurality of photovoltaic cells.

The processor 2002 is further configured to: before controlling the to-be-detected photovoltaic cell to output the first voltage, determine, based on the first output power and a current output power of the to-be-detected photovoltaic cell, a power adjustment amount corresponding to at least one first photovoltaic cell; or determine, based on the second output power and a current output power of the to-be-detected photovoltaic cell, a power adjustment amount corresponding to at least one first photovoltaic cell, where the first photovoltaic cell is any photovoltaic cell other than the to-be-detected photovoltaic cell in the plurality of photovoltaic cells; and adjust an output power of the at least one first photovoltaic cell based on the power adjustment amount corresponding to the at least one first photovoltaic cell.

In a possible implementation, the plurality of photovoltaic cells is connected to a DC/DC conversion module.

When adjusting the output power of the at least one first photovoltaic cell, the processor 2002 is configured to: send, to the DC/DC conversion module, a third control command that carries third indication information, where the third indication information indicates the DC/DC conversion module to change the output power of the at least one first photovoltaic cell based on the power adjustment amount.

In a possible implementation, the photovoltaic system includes a plurality of photovoltaic cells, and the to-be-detected photovoltaic cell is any one of the plurality of photovoltaic cells.

The processor 2002 is further configured to: before controlling the to-be-detected photovoltaic cell to work at the first voltage, determine a total target output power of the photovoltaic system based on the preset output power threshold and a current output power of each photovoltaic cell other than the to-be-detected photovoltaic cell in the plurality of photovoltaic cells; determine a total power adjustment amount of second photovoltaic cells other than the to-be-detected photovoltaic cell in the plurality of photovoltaic cells based on a preset power adjustment parameter and the total target output power; determine, based on the total power adjustment amount, a power adjustment amount corresponding to at least one second photovoltaic cell; and adjust an output power of the at least one second photovoltaic cell based on the power adjustment amount corresponding to the at least one second photovoltaic cell.

In a possible implementation, the plurality of photovoltaic cells is connected to a DC/DC conversion module.

When adjusting the output power of the at least one second photovoltaic cell, the processor 2002 is configured to: send, to the DC/DC conversion module, a fourth control command that carries fourth indication information, where the fourth indication information indicates the DC/DC conversion module to change the output power of the at least one second photovoltaic cell based on the power adjustment amount.

Correspondingly, an embodiment of this disclosure further provides a chip. The chip may be coupled to a memory, and the memory stores a program, instructions, or code. The chip may invoke the program, the instructions, or the code in the memory, to perform any photovoltaic cell detection method provided in embodiments of this disclosure.

An embodiment of this disclosure further provides a chip. The chip includes the foregoing memory, so that the chip can perform any photovoltaic detection method provided in embodiments of this disclosure.

An embodiment of this disclosure further provides a computer-readable storage medium, configured to store computer software instructions that need to be executed by the foregoing processor, and the computer software instructions include a program that needs to be executed by the foregoing processor.

A person skilled in the art should understand that embodiments of this disclosure may be provided as a method, a system, or a computer program product. Therefore, this disclosure may use a form of a hardware-only embodiment, a software-only embodiment, or an embodiment with a combination of software and hardware. In addition, this disclosure may use a form of a computer program product implemented on one or more computer-usable storage media (including but not limited to a disk memory, a compact disc read-only memory (CD-ROM), an optical memory, and the like) that include computer-usable program code.

What is claimed is:

1. A method, comprising:
controlling a to-be-detected photovoltaic cell to work at a first voltage, wherein the to-be-detected photovoltaic cell has a first output power while working at the first voltage;
obtaining, while the to-be-detected photovoltaic cell is working at the first voltage, first infrared image information of the to-be-detected photovoltaic cell;
controlling the to-be-detected photovoltaic cell to work at a second voltage, wherein the first voltage and the second voltage comprise working voltages of the to-be-detected photovoltaic cell, wherein the to-be-detected photovoltaic cell has a second output power while working at the second voltage, wherein a difference between the first output power and the second output power is less than a preset power difference threshold, and wherein the first output power and the second output power are greater than 0;
obtaining, while the to-be-detected photovoltaic cell is working at the second voltage, second infrared image information of the to-be-detected photovoltaic cell;

detecting, based on the first infrared image information and the second infrared image information, whether the to-be-detected photovoltaic cell is faulty;

obtaining a third output power corresponding to the to-be-detected photovoltaic cell by:

obtaining, based on a preset proportion parameter and a current output power of the to-be-detected photovoltaic cell, the third output power;

selecting, from a preset power range, the third output power, wherein the preset power range is based on a first adjustment parameter and a power reference value corresponding to the to-be-detected photovoltaic cell, and wherein the power reference value is based on the preset proportion parameter and the current output power;

selecting, when the to-be-detected photovoltaic cell is in a photovoltaic system comprising a plurality of photovoltaic cells and third infrared image information of a previously detected photovoltaic cell meets a first preset image detection condition, a fourth output power of the previously detected photovoltaic cell as the third output power; or selecting, when latest obtained infrared image information of the to-be-detected photovoltaic cell does not meet the first preset image detection condition, a fifth output power as the third output power, wherein the fifth output power is less than a sixth output power of the to-be-detected photovoltaic cell when the latest obtained infrared image information is obtained; and identifying, based on a correspondence between output powers of the to-be-detected photovoltaic cell at different voltages, voltages corresponding to the third output power as the working voltages.

2. The method of claim 1, wherein both the first output power and the second output power are less than a preset output power threshold.

3. The method of claim 2, wherein the preset output power threshold is a maximum power point of the to-be-detected photovoltaic cell.

4. The method of claim 3, wherein the first voltage is less than or equal to a third voltage corresponding to the to-be-detected photovoltaic cell at the maximum power point, and wherein the second voltage is greater than the third voltage.

5. The method of claim 1, wherein the first output power is equal to the second output power, and wherein the first voltage is not equal to the second voltage.

6. The method of claim 2, wherein before controlling the to-be-detected photovoltaic cell to work at the first voltage, the method further comprises:

obtaining, based on the preset output power threshold and current output powers of first photovoltaic cells other than the to-be-detected photovoltaic cell in the plurality of photovoltaic cells in the photovoltaic system, a total target output power of the photovoltaic system;

obtaining, based on a preset power adjustment parameter and the total target output power, a total power adjustment amount of second photovoltaic cells other than the to-be-detected photovoltaic cell in the plurality of photovoltaic cells;

obtaining, based on the total power adjustment amount, a power adjustment amount corresponding to at least one second photovoltaic cell; and adjusting, based on the power adjustment amount, a seventh output power of the at least one second photovoltaic cell.

7. The method of according to claim 6, wherein adjusting the third output power comprises sending, to a direct current (DC)/DC current conversion module connected to the plurality of photovoltaic cells, a control command that carries indication information, and wherein the indication information instructs the DC/DC conversion module to adjust, based on the power adjustment amount, the third output power.

8. The method of claim 1, further comprising obtaining different working voltages when the first infrared image information and the second infrared image information do not meet a second preset image detection condition.

9. The method of claim 1, wherein controlling the to-be-detected photovoltaic cell to work at the first voltage comprises sending, to a direct current (DC)/DC conversion module connected to the to-be-detected photovoltaic cell, a first control command that carries first indication information, wherein the first indication information instructs the DC/DC conversion module to enable the to-be-detected photovoltaic cell to output the first voltage, wherein controlling the to-be-detected photovoltaic cell to work at the second voltage comprises sending, to the DC/DC conversion module, a second control command that carries second indication information, and wherein the second indication information instructs the DC/DC conversion module to enable the to-be-detected photovoltaic cell to output the second voltage.

10. The method of claim 1, wherein before controlling the to-be-detected photovoltaic cell to work at the first voltage, the method further comprises:

either:

obtaining, based on the first output power and the current output power of the to-be-detected photovoltaic cell, a power adjustment amount corresponding to at least one first photovoltaic cell, wherein the to-be-detected photovoltaic cell and the at least one first photovoltaic cell are in the photovoltaic system comprising the plurality of photovoltaic cells; or obtaining, based on the second output power and the current output power, the power adjustment amount; and adjusting, based on the power adjustment amount, a seventh output power of the at least one first photovoltaic cell.

11. The method of claim 10, wherein adjusting the third output power comprises sending, to a direct current (DC)/DC conversion module connected to the plurality of photovoltaic cells, a control command that carries indication information, and wherein the indication information instructs the DC/DC conversion module to adjust, based on the power adjustment amount, the third output power.

12. A system, comprising:

a plurality of photovoltaic cells; and a photovoltaic cell detection system configured to:

control a to-be-detected photovoltaic cell to work at a first voltage, wherein the to-be-detected photovoltaic cell has a first output power while working at the first voltage;

obtain, while the to-be-detected photovoltaic cell is working at the first voltage, first infrared image information of the to-be-detected photovoltaic cell;

control the to-be-detected photovoltaic cell to work at a second voltage, wherein the first voltage and the second voltage comprise working voltages of the to-be-detected photovoltaic cell, wherein the to-be-detected photovoltaic cell has a second output power while working at the second voltage, wherein a difference between the first output power and the second output power is less than a preset power difference threshold, and wherein the first output power and the second output power are greater than 0;

obtain, while the to-be-detected photovoltaic cell is working at the second voltage, second infrared image information of the to-be-detected photovoltaic cell;

detect, based on the first infrared image information and the second infrared image information, whether the to-be-detected photovoltaic cell is faulty;

obtain a third output power corresponding to the to-be-detected photovoltaic cell by:

obtaining, based on a preset proportion parameter and a current output power of the to-be-detected photovoltaic cell, the third output power;

selecting, from a preset power range, the third output power, wherein the preset power range is based on a first adjustment parameter and a power reference value corresponding to the to-be-detected photovoltaic cell, and wherein the power reference value is based on the preset proportion parameter and the current output power;

selecting, when third infrared image information of a previously detected photovoltaic cell meets a preset image detection condition, a fourth output power of the previously detected photovoltaic cell as the third output power; or selecting, when latest obtained infrared image information of the to-be-detected photovoltaic cell does not meet the preset image detection condition, a fifth output power as the third output power, wherein the fifth output power is less than a sixth output power of the to-be-detected photovoltaic cell when the latest obtained infrared image information is obtained; and identify, based on a correspondence between output powers of the to-be-detected photovoltaic cell at different voltages, voltages corresponding to the third output power as the working voltages.

13. The photovoltaic system of according to claim 12, wherein both the first output power and the second output power are less than a preset output power threshold.

14. The system of claim 13, wherein the preset output power threshold is a maximum power point of the to-be-detected photovoltaic cell.

15. The system of claim 14, wherein the first voltage is less than or equal to a third voltage corresponding to the to-be-detected photovoltaic cell at the maximum power point, and wherein the second voltage is greater than the third voltage.

16. The system of claim 12, wherein the first output power is equal to the second output power, and wherein the first voltage is not equal to the second voltage.

* * * * *